United States Patent
Tae

(10) Patent No.: US 9,720,529 B2
(45) Date of Patent: Aug. 1, 2017

(54) ELECTRONIC DEVICE AND METHOD OF CONTROLLING THE SAME

(71) Applicant: LG Electronics Inc., Seoul (KR)

(72) Inventor: Kyongpil Tae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 13/738,730

(22) Filed: Jan. 10, 2013

(65) Prior Publication Data

US 2013/0265246 A1  Oct. 10, 2013

(30) Foreign Application Priority Data

Apr. 6, 2012 (KR) .................. 10-2012-0036214

(51) Int. Cl.
*G06F 3/048* (2013.01)
*G06F 3/041* (2006.01)
*G06F 3/0488* (2013.01)
*G06F 3/0481* (2013.01)

(52) U.S. Cl.
CPC ............ *G06F 3/041* (2013.01); *G06F 3/0481* (2013.01); *G06F 3/0488* (2013.01); *G06F 2203/04806* (2013.01); *G06F 2203/04808* (2013.01)

(58) Field of Classification Search
CPC ......... G06F 3/0488; G06F 2203/04806; G06F 3/041; G06F 3/0481; G06F 2203/04808
USPC ........................... 345/173; 715/700, 863, 864
See application file for complete search history.

(56) References Cited

U.S. PATENT DOCUMENTS

| | | | |
|---|---|---|---|
| 7,075,512 B1 * | 7/2006 | Fabre ................... | G06F 3/0481 345/156 |
| 7,737,958 B2 * | 6/2010 | Jeon .................... | G06F 3/04886 345/156 |
| 8,259,136 B2 * | 9/2012 | Kim ..................... | G06F 3/0488 345/660 |
| 8,458,617 B2 * | 6/2013 | Victor .................. | G06F 3/0482 345/173 |
| 8,766,928 B2 * | 7/2014 | Weeldreyer .......... | G06F 3/0481 345/173 |
| 8,791,944 B2 * | 7/2014 | Cho ..................... | 345/419 |
| 9,086,731 B2 * | 7/2015 | Hisano ................. | G06F 3/017 |
| 2001/0030667 A1 * | 10/2001 | Kelts .................... | G06F 3/0481 715/854 |
| 2009/0153478 A1 * | 6/2009 | Kerr et al. .......... | 345/158 |
| 2009/0228828 A1 * | 9/2009 | Beatty ................. | G06F 3/0488 715/786 |

(Continued)

FOREIGN PATENT DOCUMENTS

| | | |
|---|---|---|
| EP | 2177983 A2 | 4/2010 |
| WO | WO 2011/041547 A1 | 4/2011 |
| WO | WO 2011041547 A1 * | 4/2011 ........... G06F 3/0483 |

*Primary Examiner* — Jason Mandeville
(74) *Attorney, Agent, or Firm* — Birch, Stewart, Kolasch & Birch, LLP

(57) ABSTRACT

A mobile terminal including a touch screen, and a controller configured to designate a plurality of areas on the touch screen, each area including text information, receive a multi touch action on the touch screen, select a specific area from the plurality of designated areas regardless of areas touched in the multi touch action, determine at least one touch in the multi touch action is moving, and adjust a magnification rate of the text information included in the selected specific area in correspondence with the at least one touch moving.

12 Claims, 32 Drawing Sheets

(56) References Cited

U.S. PATENT DOCUMENTS

| | | | |
|---|---|---|---|
| 2010/0083111 A1* | 4/2010 | de los Reyes | G06F 3/0482 715/702 |
| 2010/0134425 A1* | 6/2010 | Storrusten | 345/173 |
| 2010/0188423 A1* | 7/2010 | Ikeda | G06F 3/03547 345/659 |
| 2010/0283743 A1* | 11/2010 | Coddington | 345/173 |
| 2011/0078560 A1* | 3/2011 | Weeldreyer et al. | 715/255 |
| 2011/0107209 A1* | 5/2011 | Ha et al. | 715/702 |
| 2011/0122157 A1* | 5/2011 | Fabre | G06F 3/0481 345/661 |
| 2011/0267371 A1 | 11/2011 | Song et al. | |
| 2012/0052921 A1 | 3/2012 | Lim et al. | |
| 2012/0278712 A1* | 11/2012 | Wright | G06F 3/04883 715/702 |
| 2013/0050269 A1* | 2/2013 | Arrasvuori | G06T 3/0025 345/661 |

* cited by examiner

ELECTRONIC DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No.10-2012-0036214, filed on 6 Apr. 2012, the contents of which are incorporated by reference herein in their entirety.

FIELD OF THE INVENTION

The present invention relates to mobile terminal including a user interface through for easily adjusting a magnification rate of text information.

DISCUSSION OF THE RELATED ART

Considerable advancements in various electronic devices including mobile terminals and the related hardware and software technologies have enabled a user to access a variety of items of information using the electronic device.

However, according to the related art, the user has to operate many searching menus or system settings to change a magnification rate (or a font size) of text information.

SUMMARY OF THE INVENTION

Accordingly, one object of the present invention is to address the above noted and other problems of the related art.

Another object of the present invention is to provide an electronic device and corresponding method that provides a user interface through which a magnification rate of text information can be easily adjusted by performing a simple operation with respect to a touch screen.

To achieve these and other advantages and in accordance with the purpose of the present invention, as embodied and broadly described herein, the present invention provides in one aspect a mobile terminal including a touch screen, and a controller configured to designate a plurality of areas on the touch screen, each area including text information, receive a multi touch action on the touch screen, select a specific area from the plurality of designated areas regardless of areas touched in the multi touch action, determine at least one touch in the multi touch action is moving, and adjust a magnification rate of the text information included in the selected specific area in correspondence with the at least one touch moving.

In another aspect, the present invention provides a method of controlling a mobile terminal, and which includes designating, via a controller of the mobile terminal, a plurality of areas on the touch screen, each area including text information; receiving, via a touch screen of the mobile terminal, a multi touch action; selecting, via the controller, a specific area from the plurality of designated areas regardless of areas touched in the multi touch action; determining, via the controller, at least one touch in the multi touch action is moving; and adjusting, via the controller, a magnification rate of the text information included in the selected specific area in correspondence with the at least one touch moving.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Figure 1:
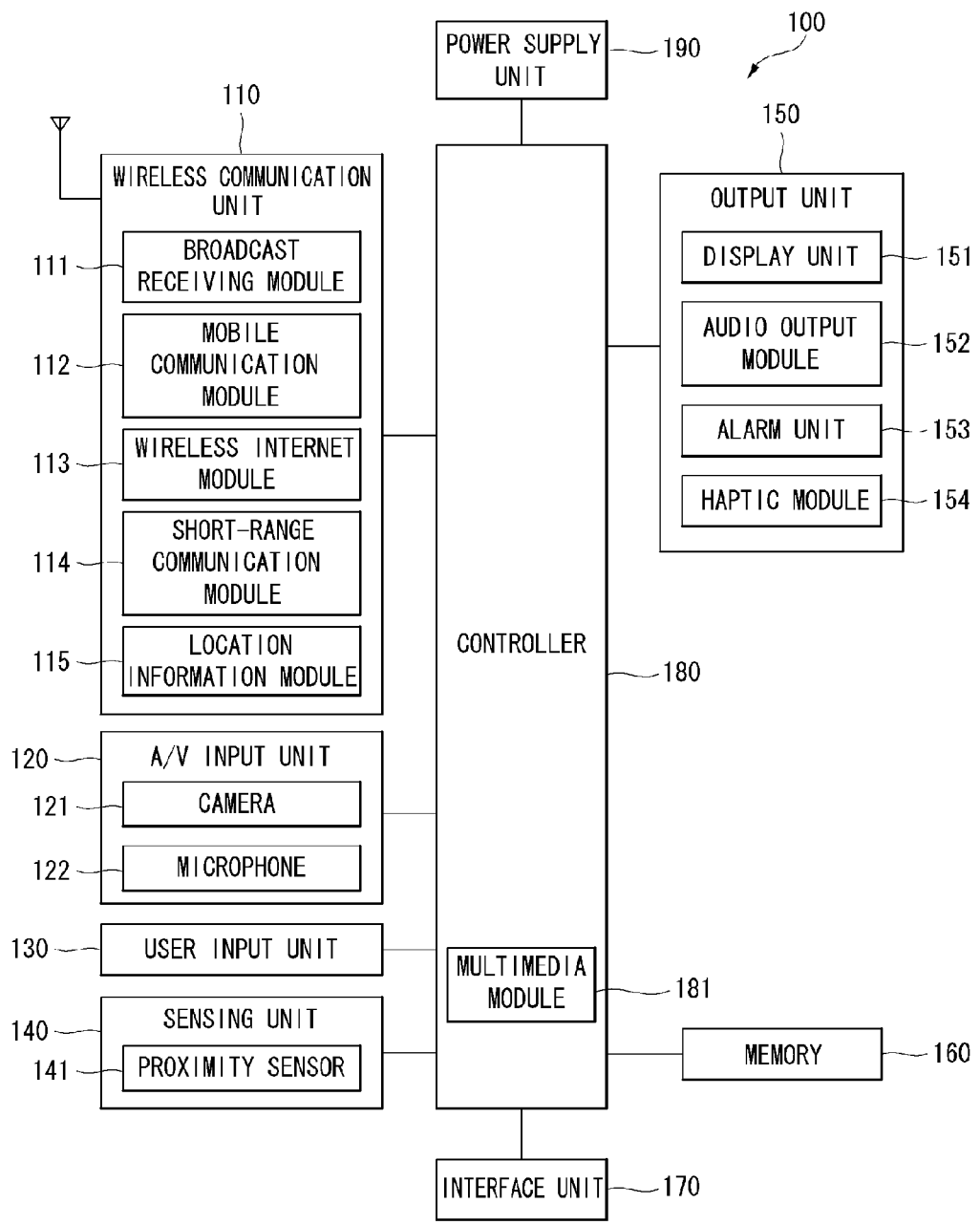
FIG. 1 is a block diagram of a mobile terminal according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

The present invention relates to an electronic device, and more particularly to an electronic device and a method of controlling the electronic device, both of which provide a new user interface for selecting, executing and controlling an item displayed on a touch screen.

The present invention, as described below, may be embodied in the electronic device equipped with the touch screen. Further, the electronic device includes mobile terminals, PDAs, laptops, phones, etc.

According to an embodiment of the present invention, when a user touches his/her fingers to an arbitrary area on the touch screen, when the multiple items are displayed on the touch screen of the electronic device.

The user interface may include a first control area. The multiple colors, which the multiple items displayed on the touch screen correspond to, respectively, corresponds to the first control area. Here, because the user interface is provided, the color corresponding to each of the multiple items may be displayed to show one-to-one correspondence relationship between the multiple items and the multiple colors to the user.

The user may select, execute, and control each of the multiple items through the use of the first control area that the multiple colors correspond to. For example, when the user drags his/her finger on the first control area that the multiple colors correspond to, the item corresponding to the color displayed on the position across which the finger moved may be selected.

Furthermore, the user interface may include a second control area provided in a position different from that of the first control area, which is described below. The second control area may be assigned a function of navigating the multiple items displayed on the touch screen, or may be assigned a function of executing a specific item selected through the use of the first control area, in the same manner as the first control area.

The first and second control areas may be used to select, execute, or control the multiple items displayed on the touch screen, through a reciprocal and complementary relationship.

Various embodiments, which are embodied by the user interface including the first and second control areas, are described below in detail with reference to the related drawings.

FIG. 1 is a block diagram of a mobile terminal 100 according to an embodiment of the present invention. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 will now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to a hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to a software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
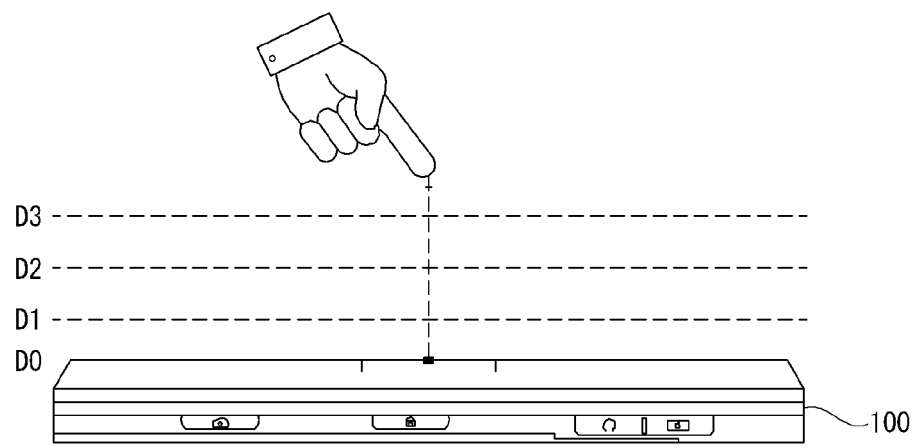
FIG. 2 is a conceptual diagram illustrating a proximity depth of a proximity sensor.

Next, FIG. 2 is a conceptual view illustrating a proximity depth of the proximity sensor 141. As shown in FIG. 2, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 2 also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

In the present invention, the display unit 151 is defined as a touch screen 151 for the convenience of description. As described above, the touch screen 151 may perform both a function of displaying information and a function of inputting information. However, it is apparently emphasized that the prevent invention is not limited thereto. The term touch, mentioned in the present specification, is construed to mean both a contact touch and a proximity touch.

Figure 3:
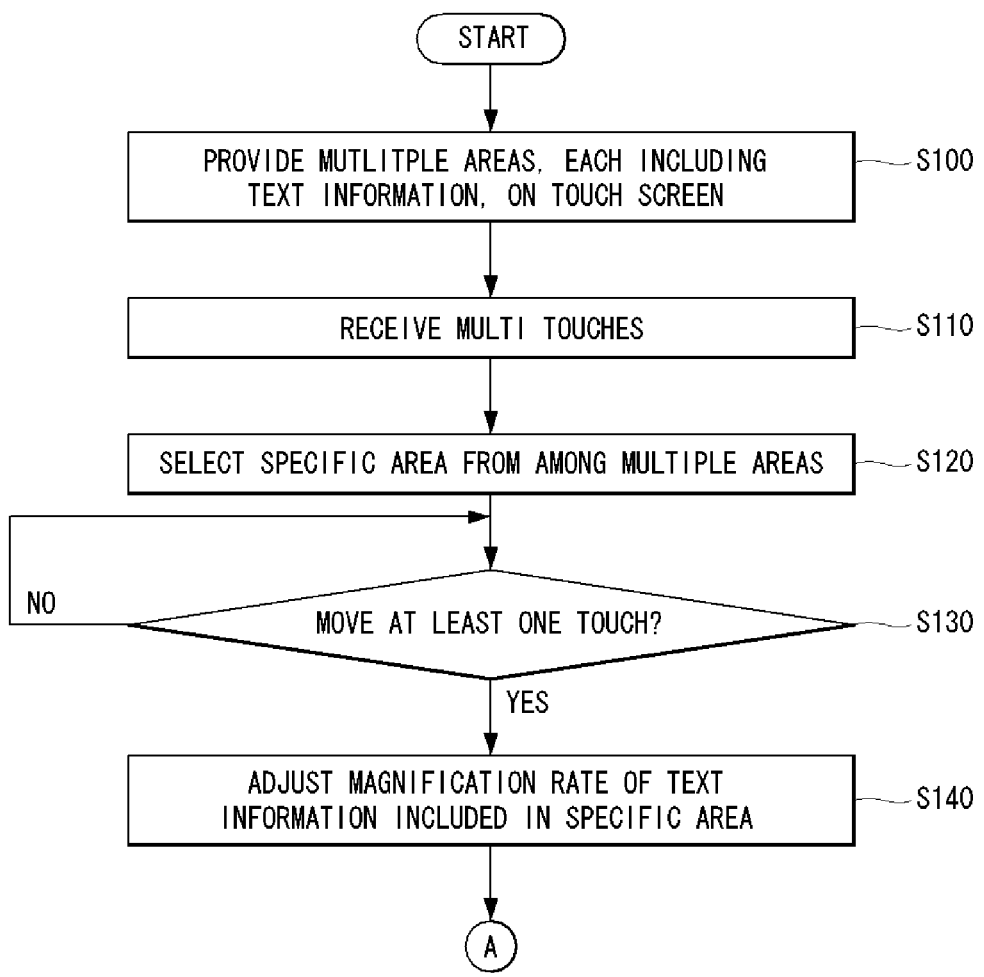
FIG. 3 is a flow chart illustrating a method of controlling an electronic device according to a first embodiment of the present invention.

Next, FIG. 3 is a flow chart illustrating a method of controlling an electronic device according to a first embodiment of the present invention. Further, FIGS. 4 to 12 are diagrams illustrating the method of controlling the electronic device according to the first embodiment of the present invention.

Figure 4:
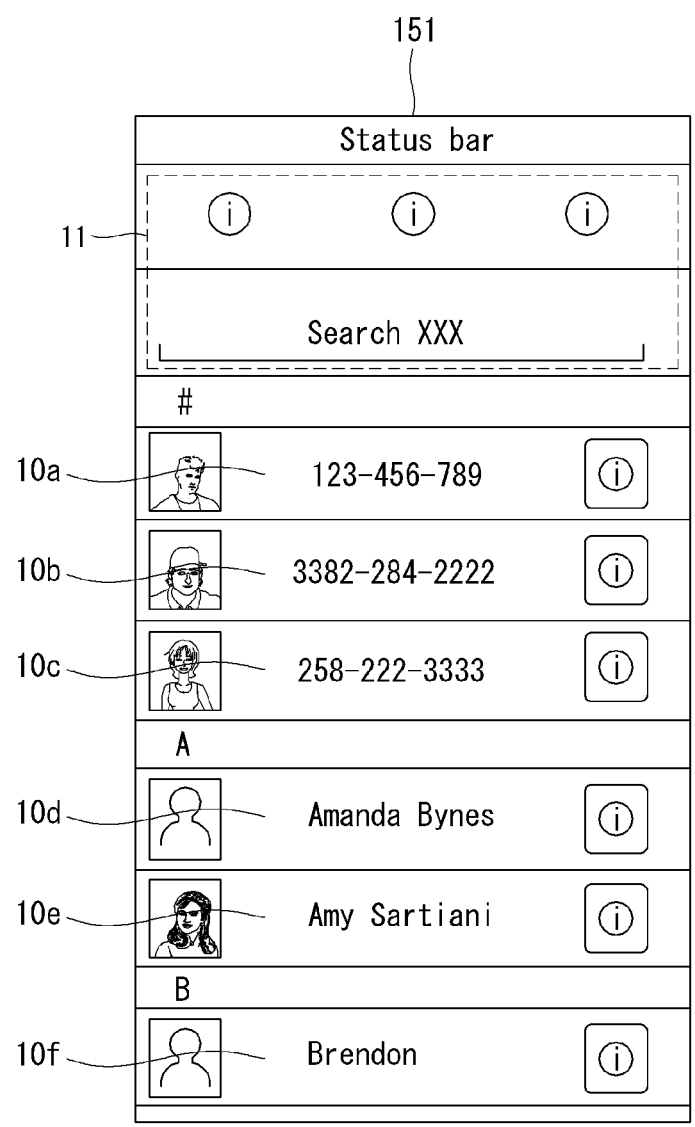
FIG. 4 is a diagram illustrating an example in which multiple areas, each including text information, are provided on a touch screen.

As shown in FIG. 3, the controller 180 provides the multiple areas, each of which includes text information, on the touch screen 151 (S100). FIG. 4 illustrates an example in which the multiple areas are provided on the touch screen 151. FIG. 4 is a diagram illustrating a contact book, like a phone book.

For example, with reference to FIG. 4, the controller 180 provides the multiple areas 10*a*, 10*b*, 10*c*, 10*d*, 10*e*, and 10*f*, to which the features of the present invention are applied, on the touch screen 151.

The multiple areas 10*a*, 10*b*, 10*c*, 10*d*, 10*e*, and 10*f* may be provided in the form of a list, as illustrated in FIG. 4, but this arrangement is not limited thereto. The multiple areas may be provided in the form different from the list illustrated in FIG. 4, as in the embodiments described below.

On the other hand, the controller 180 provides areas other than the multiple areas 10*a*, 10*b*, 10*c*, 10*d*, 10*e*, and 10*f* on the touch screen 151. For example, with reference to FIG. 4, an area 11 other than the multiple areas 10*a*, 10*b*, 10*c*, 10*d*, 10*e*, and 10*f* may be provided on the touch screen 151.

In one example, the embodiment of the present invention can be not applied to the other area 11. For example, when a magnification rate of text information (or a font size), included in each of the multiple areas 10*a*, 10*b*, 10*c*, 10*d*, 10*e*, and 10*f*, changes according to the embodiment of the present invention, the magnification rate of text information included in the other area 11 may not change.

Then, as shown in FIG. 3, the controller 180 receives multi touches via the touch screen 151 (S110). The controller 180 then selects a specific area from among the multiple areas based on the multiple touches (S120).

Figure 5:
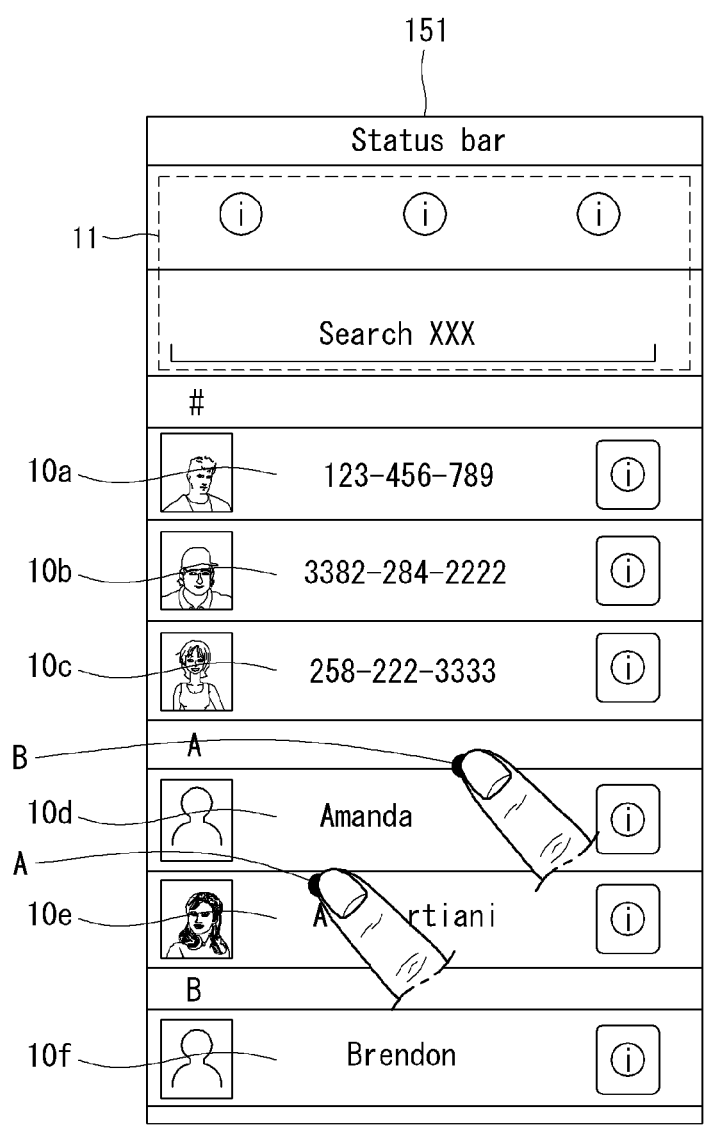
FIG. 5 is a diagram illustrating an example in which an arbitrary two points A and B are multi-touched on the touch screen by a user.

In particular, FIG. 5 illustrates an example in which arbitrary two points A and B on the touch screen 151 are multi-touched by the user. In this example, the controller 180 selects the specific area from among the multiple areas 10*a*, 10*b*, 10*c*, 10*d*, 10*e*, and 10*f*, based on the multi touches received in Step S110.

The controller 180 may also select the specific area from among the multiple areas 10*a*, 10*b*, 10*c*, 10*d*, 10*e*, and 10*f*, according to a predetermined reference, regardless of the points that are multi-touched. For example, as illustrated in FIG. 5, when the user multi-touches the arbitrary two points A and B, the controller 180 may select the specific area 10*a* at the highest position from among the multiple areas 10*a*, 10*b*, 10*c*, 10*d*, 10*e*, and 10*f*. Here, many of the predetermined references may be defined which serve a basis for selecting the specific area.

For example, the specific area selected may be the last item or area selected, the most commonly item or area selected, a selected item or area set by the user, a selected item or area including advertisement banners (so the user can easily remove, dim, highlight, etc., the banners), a selected item or area based on a current date (e.g., day of the month), etc.

Thus, if a user had two different numbers for calling their mother (e.g., a work and home number), the controller 180 can select an item or area 10a corresponding to the mothers contact based on a multi touch, even though the mothers contact item or area itself was not touch (e.g., regardless of the points that are multi-touched.)

Thus, the controller 180 can select the mother's contact item or area based on the number of times the mother's contact item or area is selected, based on the user setting, based on an intimacy level between the user and their mother (number of calls, user set intimacy level, number of common social networks using).

Thus, the present invention is particularly advantageous, because the user can select an item based on a multi touch action that does not touch the item itself. For example, when a user touches a contact item to call their mother, the call is instantly initiated. Sometimes the user wants to view or zoom in/out on the information included in contact information for their mother. This is particular true when the user has multiple contacts for their mother. Thus, when the user wants to contact their mother, especially in a situation which has poor lighting or the user is driving their car, the user may want to quickly zoom in or zoom out on the contact information to make sure they are calling the correct contact number.

This example also applies to all situations for zooming in/out and selecting items or areas regardless of the areas touched. A similar concept applies to moving the selected specific area. For example, the user may want the selected specific area to be displayed at the top of the terminal when the user is driving. The user may also want the magnified and moved portion to be displayed on an external device such as a heads up display or navigation system in an automobile. The selected area can also be transmitted externally to a near field device in close proximity to the user. Thus, the user could select, zoom in on, and transmit the zoomed contact information to another person in the vehicle to call the contact information (and thus free up the driver from having to performing calling or any other functions on the mobile terminal).

Further, the controller 180 may move the specific area 10a from the touch screen 151 to a predetermined position, when the specific area 10a is selected by receiving the multi touches.

Figure 6:
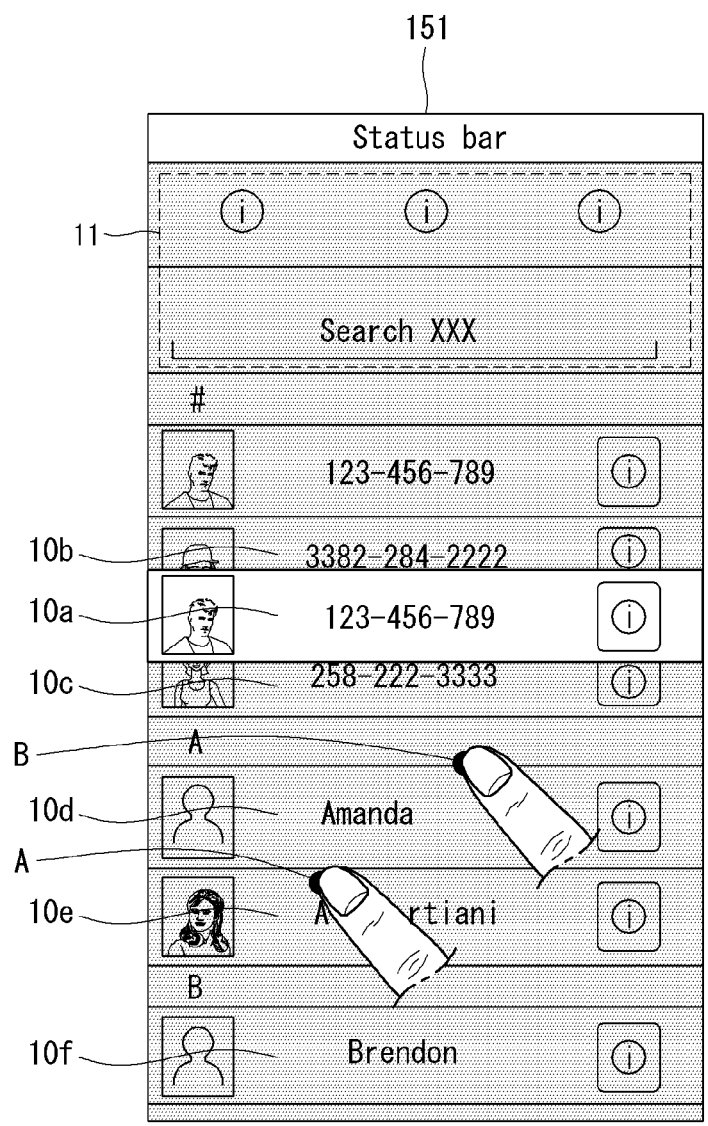
FIG. 6 is a diagram illustrating an example in which a specific area selected is moved to a predetermined position.
Figure 7:
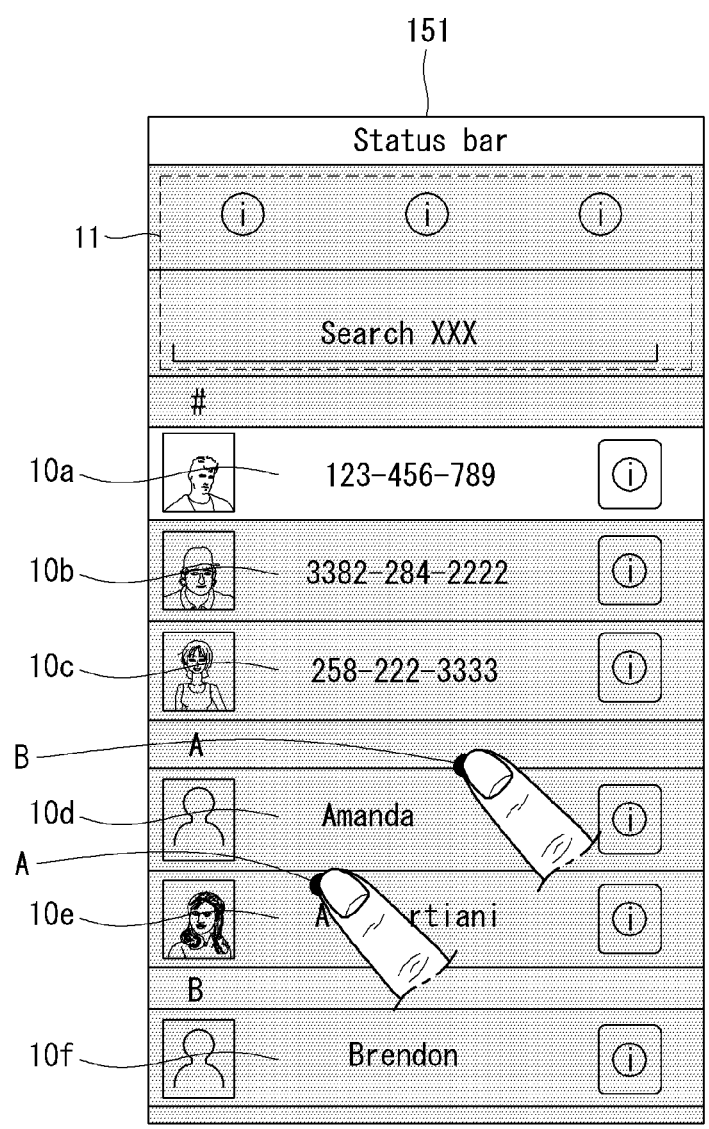
FIG. 7 is a diagram illustrating an example in which the selected specific area is selected by the multi touches, when the selected specific area is not moved and is positioned fixedly as before receiving the multi touches.

In particular, FIG. 6 illustrates an example in which the selected specific area 10a is moved to the predetermined position. FIG. 7 illustrates an example in which the selected specific area 10a is selected by the multi touches, when the selected specific area 10 is not moved and is positioned fixedly as before receiving the multi touches.

Figure 9:
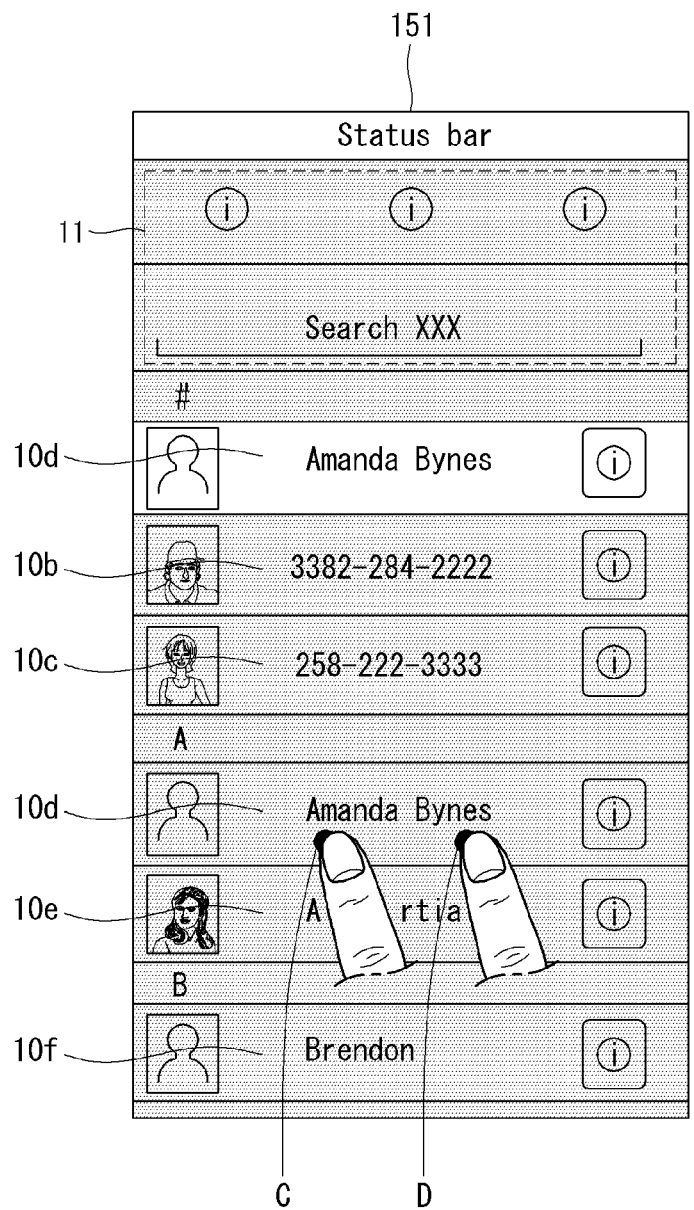

As illustrated in FIGS. 6 and 9, when the specific area 10a or 10d is selected, the controller 180 can highlight only the selected specific area 10a or 10d, or dim/make invisible the other areas.

In addition, when the specific area 10a or 10d is selected, the controller 180 may separately display the selected specific area 10a or 10d in the form of a popup window on the touch screen 151 or may display the selected specific area 10a or 10d somewhat larger than it originally appears. In addition, when a panel is mounted on the touch screen 151 to embody stereoscopic vision using binocular disparity, the controller 180 may display the selected specific area 10a or 10d as a three-dimensional object.

On the other hand, the controller 180 may select an area, including all of the two touch points making up the multi touches, as the specific area.

Figure 8:
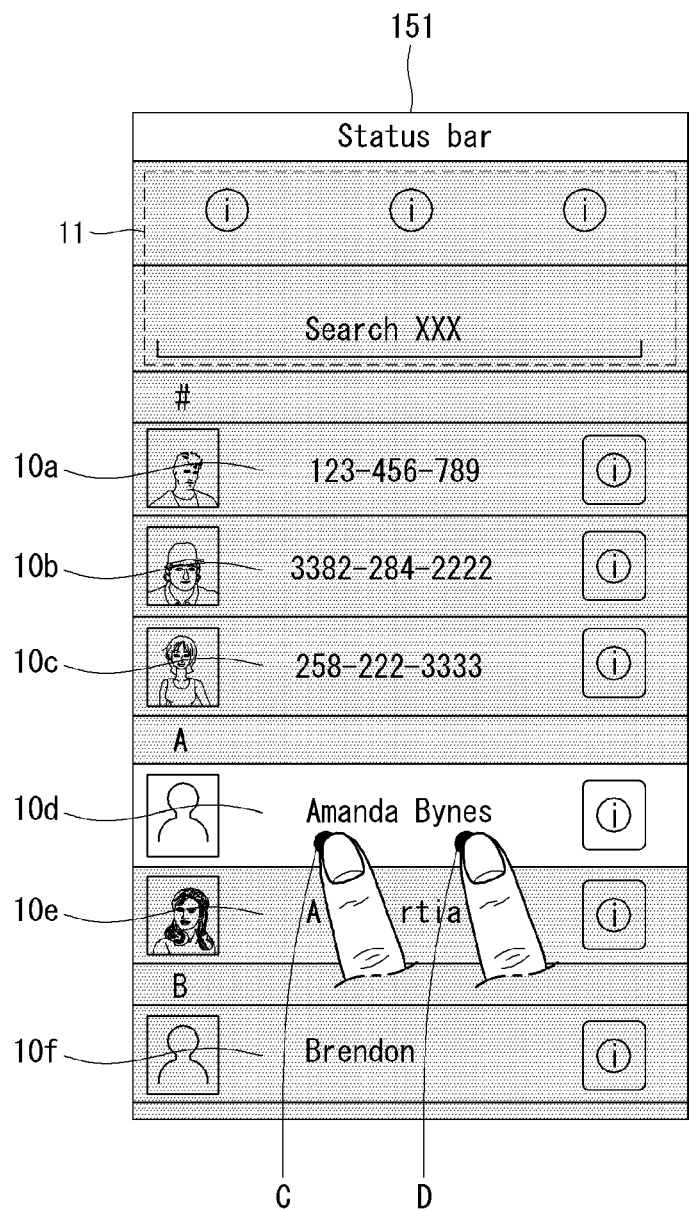
FIGS. 8 and 9 are diagrams illustrating different examples in which Steps S110 and S120 in FIG. 3 are performed, respectively.

Next, FIGS. 8 and 9 illustrate different examples, in which Steps S110 and S120 are performed, respectively. For example, with reference to FIG. 8, the controller 180 may select the area 10d, including all two touch points C and D making up the multi touches, as the specific area.

FIG. 8 illustrates an example in which the selected specific area 10d is not moved, as in the case of FIG. 7. In addition, as described above and as illustrated in FIG. 9, the selected specific area 10d may be moved to the predetermined position to be displayed.

Then, as shown in FIG. 3, the controller 180 determines whether at least one touch of the multi touches has moved (S130). When at least one touch of the multi touches has moved (Yes in Step S130), the controller 180 adjusts the magnification rate of text information included in the specific area selected in Step S120 in response to the touch movement (S140).

Figure 10:
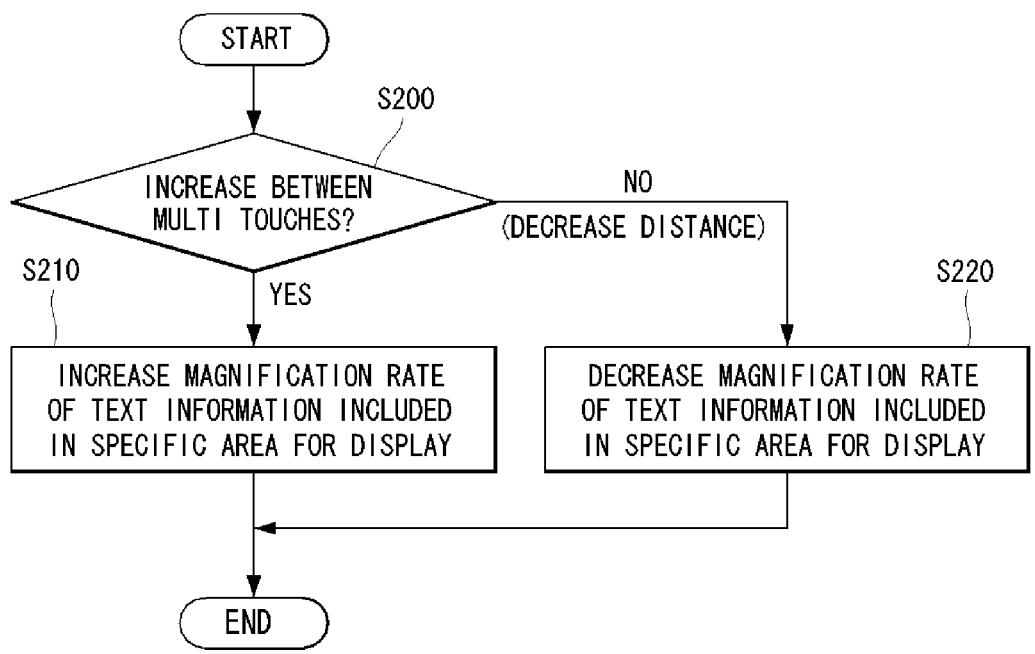
FIG. 10 is a detailed flow chart illustrating a method of controlling an electronic device according to an embodiment of the present invention.

In particular, FIG. 10 is a detailed flow chart illustrating features in Steps S130 and S140 in FIG. 3. That is, the controller 180 determines whether a distance between the two points, making the multi touches, is increased, as at least one touch of the multi touches moves (S200).

When the distance between the two points is increased (Yes in Step S200), the controller 180 increases the magnification rate of text information included in the selected specific area for display (S210).

When the distance between the two points is decreased (No in Step S200), the controller 180 decrease the magnification rate of text information included in the selected specific area for display (S220).

Figure 11:
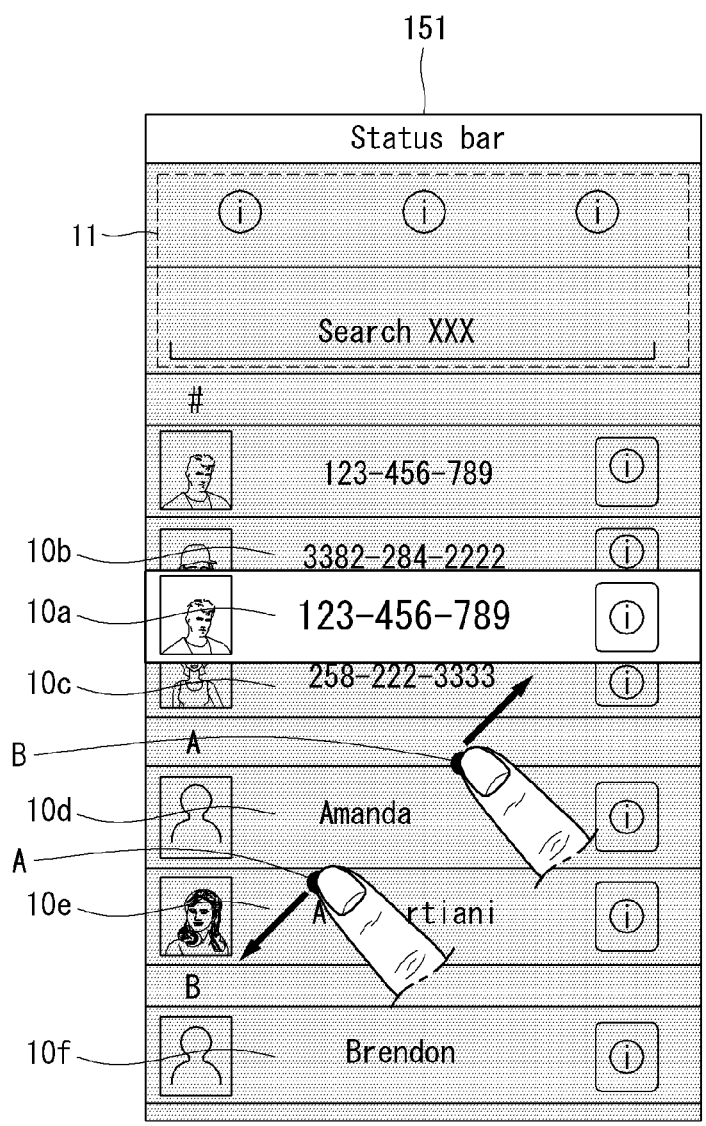
FIG. 11 is a diagram illustrating an example in which Step S210 in FIG. 10 is performed.
Figure 12:
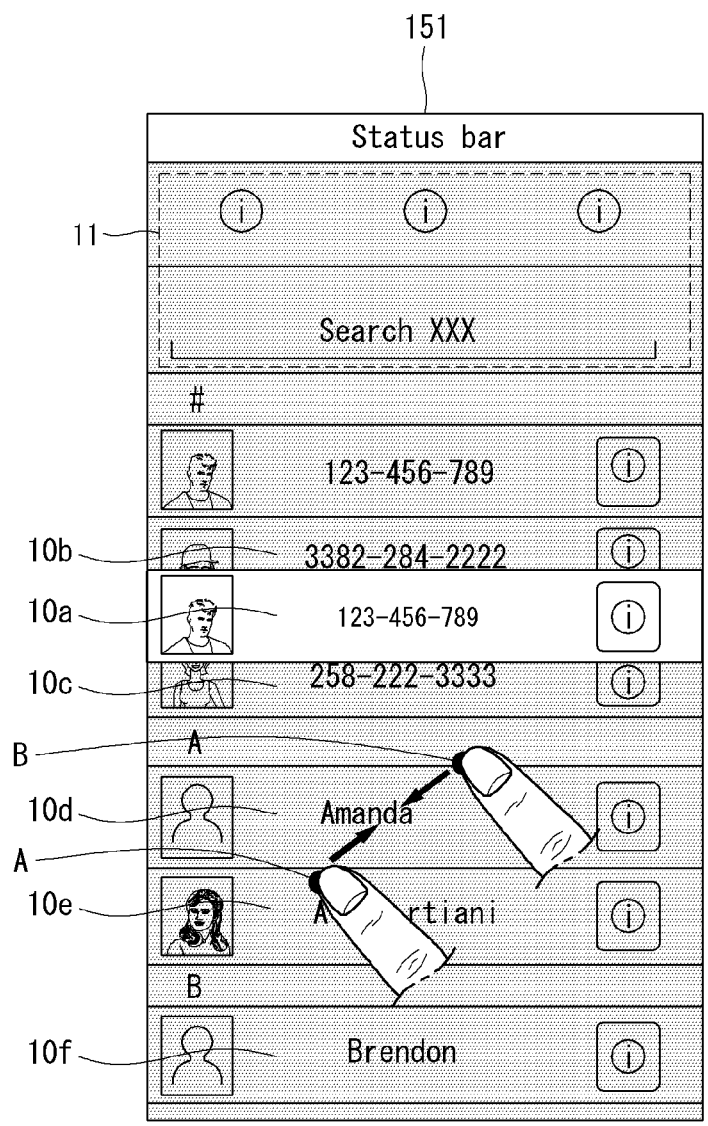
FIG. 12 is a diagram illustrating an example in which Step S220 in FIG. 10 is performed.

FIG. 11 is a diagram illustrating a screen example in which Step S210 is performed, and FIG. 12 is a diagram illustrating a screen example in which Step S220 is performed.

For example, with reference to FIG. 11, when the distance between the two points is increased, as the multi touches move in the direction indicated by the arrow illustrated in FIG. 11, when the specific area 10a is selected by receiving the multi touches with respect to the two points A and B, the controller 180 increases the magnification rate of text information (123-456-789) included in the selected specific area 10a, that is, the font size, for display.

Here, the controller 180 can adjust the magnification rate of text information (123-456-789) included in the specific area 10a for display, in such a manner as to be linked in real time to the movement of the multi touches. That is, the more increased the distance between the two points making up the multi touches is, the greater the controller 180 can make the magnification rate of text information (123-456-789) for display.

In addition, with reference to FIG. 12, when the distance between the two points is decreased, as the multi touches move in the direction indicated by the arrow illustrated in FIG. 12, when the specific area 10a is selected by receiving the multi touches with respect to the two points A and B, the controller 180 can decrease the magnification rate of text information (123-456-789) included in the selected specific area 10a, that is, the font size, for display.

Also in FIG. 12, as in FIG. 11, the controller 180 can adjust the magnification rate of text information (123-456-789) included in the specific area 10a for display, in such a manner as to be linked in real time to the movement of the multi touches. That is, the more decreased the distance between the two points making up the multi touches is, the smaller the controller 180 may make the magnification rate of text information (123-456-789) for display.

Here, the controller 180 can assist the user to visually focus on a process of adjusting the magnification rate of text information included in the specific area by dimming areas other than the specific area in a darkening manner or making the areas other than the specific area completely invisible while adjusting the magnification rate of text information included in the selected specific area selected in response to the touch movement.

In addition, while adjusting the magnification rate of text information included in the selected specific area 10a, as at least one touch of the multi touches move, the controller 180 may not adjust the magnification rates of the remaining areas 10b, 10c, 10d, 10e, and 10f, or may adjust the magnification rates of the remaining areas 10b, 10c, 10d, 10e, and 10f in the same as the area 10a.

Figure 13:
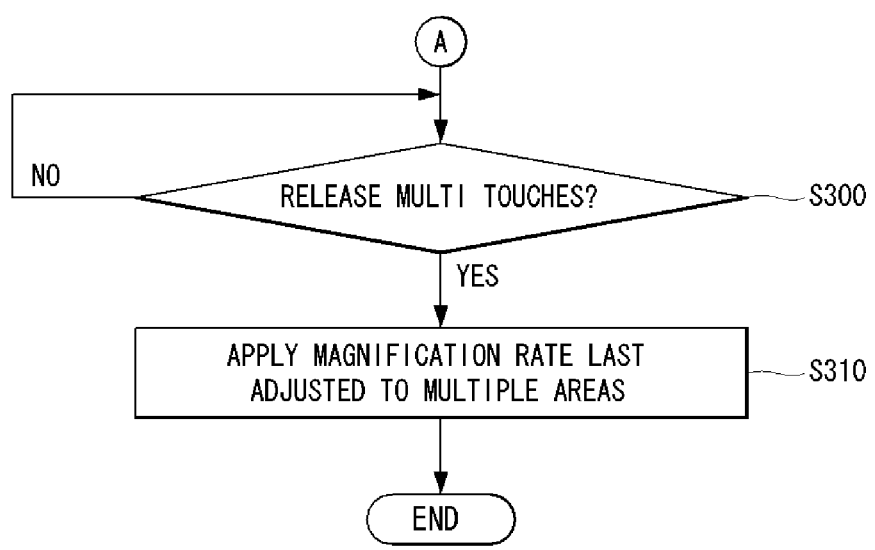
FIG. 13 is a flow chart illustrating a method of controlling an electronic device according to a second embodiment of the present invention.

Next, FIG. 13 is a flow chart illustrating a method of controlling the electronic device according to a second embodiment of the present invention, which is built on the steps illustrated in FIG. 3. FIGS. 14 to 29 are diagrams illustrating the method of controlling the electronic device according to the second embodiment of the present invention.

The method of controlling the electronic device according to the second embodiment of the present invention may be embodied in the electronic device 100 described with reference to FIGS. 1 and 2. The method of controlling the electronic device according to the second embodiment of the present invention and the operation of the electronic device 100 for embodying this method are described below in detail with reference to the related drawings.

The controller 180 determines whether the multi touches are released, while the magnification rate of text information included in the selected specific area is adjusted in response to the movement of at least one touch of the multi touches according to the first embodiment (S300).

When the multi touches are released (Yes in S300), the controller 180 applies the magnification rate, last adjusted, to all of the multiple areas defined in Step S100 (S310). The release of the multi touches means that the user keeps at least one of the two touches making up the multi touches, away from the touch screen 151.

Figure 14:
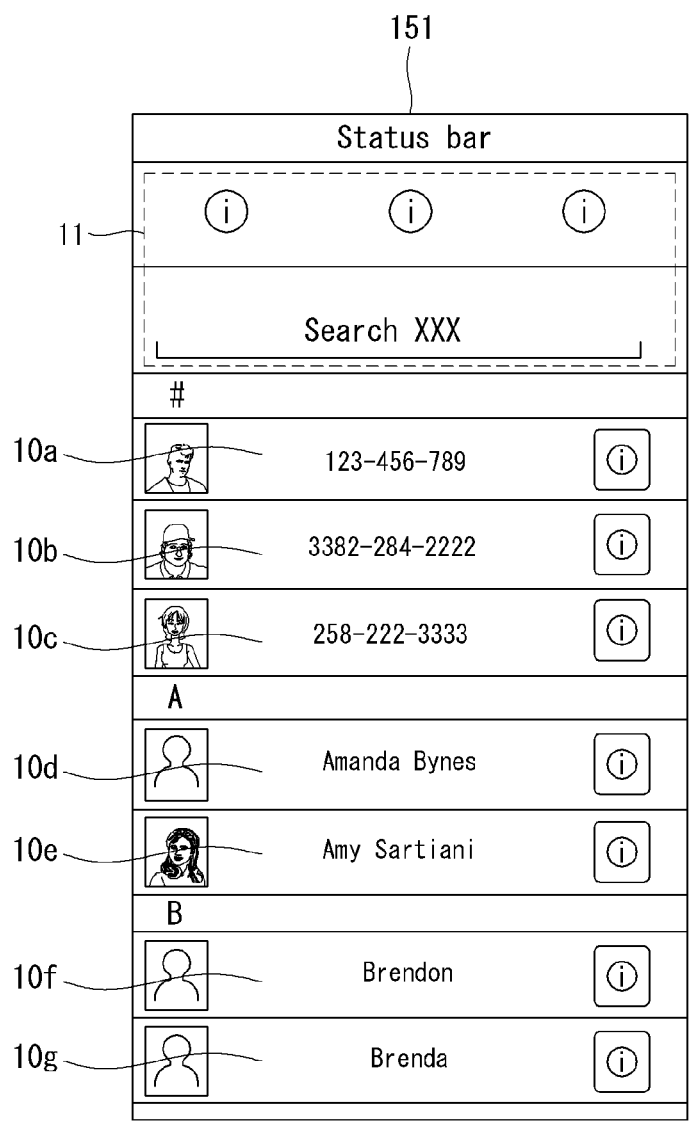
FIG. 14 is a diagram illustrating a screen example in which Step S310 in FIG. 13 is performed.

In particular, FIG. 14 illustrates a screen example in which Step S310 is performed. For example, with reference to FIG. 14, the specific area 10a is returned to its original position displayed before the multi touches are received, when the multi touches are released and the rate of text information included in the selected specific area 10a is adjusted in such a manner as to be enabled to be decreased, as illustrated in FIG. 12. Thus, the magnification rate of text information (the magnification rate, last adjusted immediately before the release of the multi touches) illustrated in FIG. 12 is applied to all of the multi areas 10a, 10b, 10c, 10d, 10e, 10f, and 10g.

That is, the controller 180 applies the magnification rate, last adjusted, with respect to text information included in the selected specific area 10a, to all items of text information included in each of the multiple areas 10a, 10b, 10c, 10d, 10e, 10f, and 10g.

For example, a comparison of FIGS. 4 and 14 illustrate that the area 10g, not displayed in FIG. 4, is displayed in FIG. 14. For FIG. 4, the controller 180 may apply the magnification rate, last adjusted, to all of the multiple areas 10a, 10b, 10c, 10d, 10e, 10f, and 10g and further may adjust also an image displayed around text information included in each area in the same magnification rate.

Accordingly, in FIG. 14, the area 10g may be additionally displayed, which is not displayed in FIG. 4, when a layout in which the multiple areas 10a, 10b, 10c, 10d, 10e, 10f, and 10g are displayed is changed.

Furthermore, according to the embodiment of the present invention, the controller 180, unlike in the case of FIG. 14, may not apply the magnification rate, last adjusted, to the image displayed around text information included in each area to maintain its original size. In such a case, the layout in which the multiple areas 10a, 10b, 10c, 10d, 10e, 10f, and 10g are displayed is not changed, and unlike in the case of FIG. 14, the area 10a, not displayed in FIG. 4, is not additionally displayed.

On the other hand, the controller 180, unlike in Step S310, may apply the magnification rate, last adjusted before the release of the multi touches, only to the selected specific area, when the multi touches are released.

Further, according to the embodiments of the present invention, described above, the controller 180 can display an indicator indicating a stage of adjusting the magnification rate of text information on the touch screen 151, while the magnification rate of text information included in the selected specific area is adjusted, as the specific area is selected from among the multiple areas provided on the touch screen 150, by the multi touches, and at least one of the multiple touches move.

Next, FIGS. 15 to 20 are diagrams for describing the indicator for visually indicating a process of adjusting the magnification rate of text information.

Figure 15:
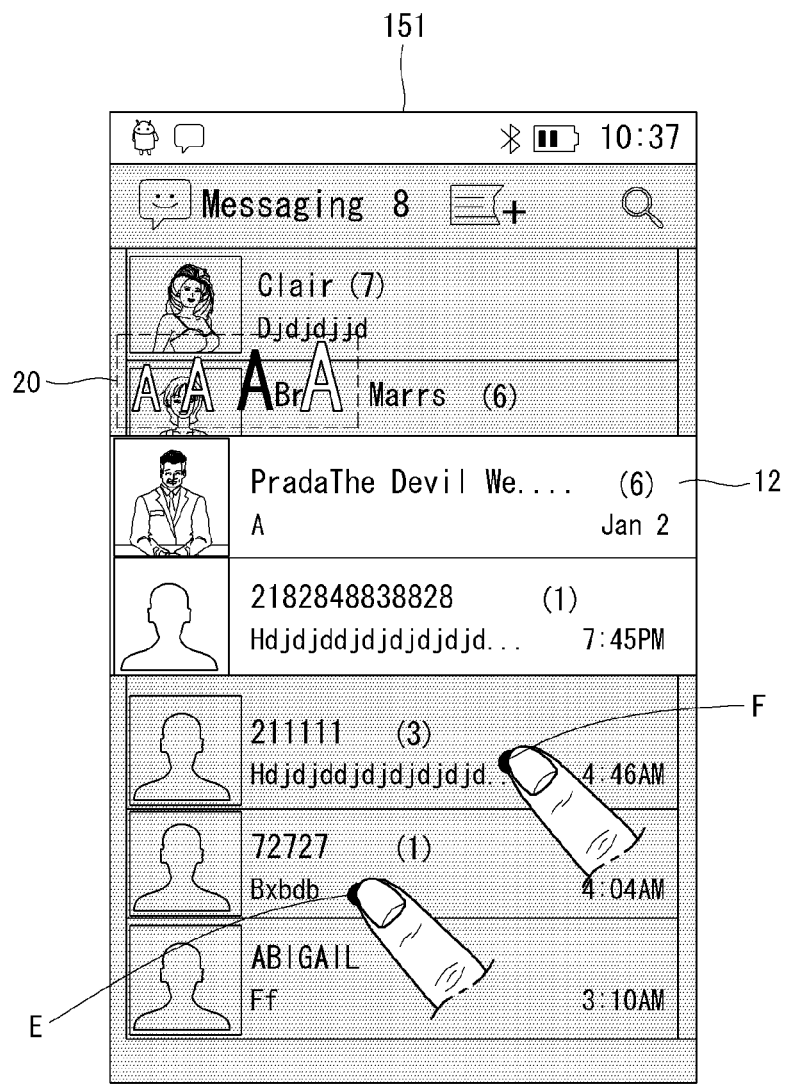
FIGS. 15 to 20 are diagrams illustrating an indicator for visually indicating a process of adjusting a magnification rate of text information.

For example, with reference to FIG. 15, the controller 180 displays a set 20 of letters (including symbols), different in size according to the stage, as the indicator for indicating the stage of adjusting the magnification rate of text information, on the touch screen 151.

Each of the letters, different in size, which are included in the set 20 of letters, may indicate the magnification rate currently applied to text information included in the selected specific area 12. The letter of which the size corresponds to the magnification rate currently applied, in the set 20 of letters, may be visually emphasized as illustrated in FIG. 15. For example, FIG. 15 illustrates that the third largest one of the four magnification rates available for application to text information is applied.

Figure 16:
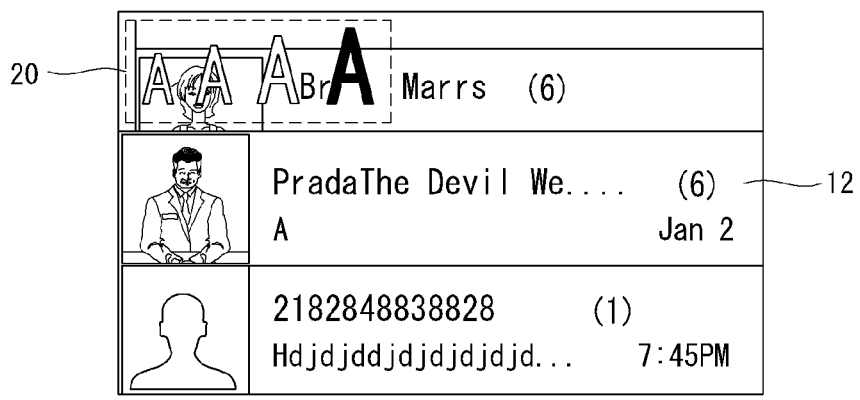

As described above, as the distance between the two points making up the multi touches is increased, the controller 180 increases the magnification rate of text information included in the selected specific area 12 and at the same time adjusts the stage of the set 20 of letters to a higher level as illustrated in FIG. 16.

Figure 17:
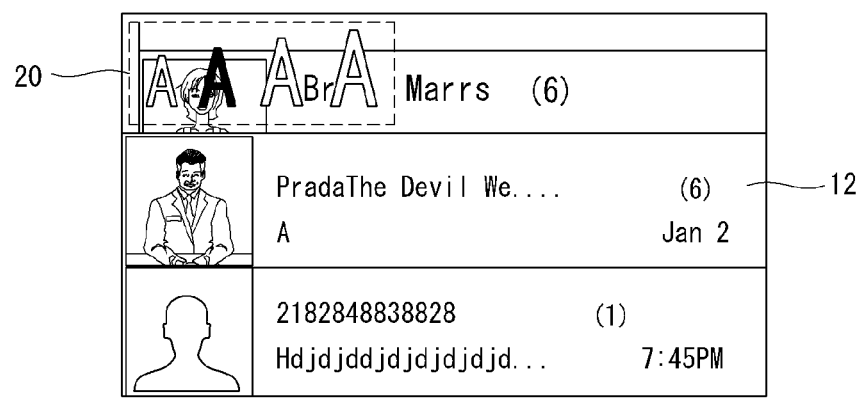

As described above, as the distance between the two points making up the multi touches is increased, the controller 180 increases the magnification rate of text information included in the selected specific area 12 and at the same time adjusts the stage of the set 20 of letters to a lower level as illustrated in FIG. 17.

Figure 18:
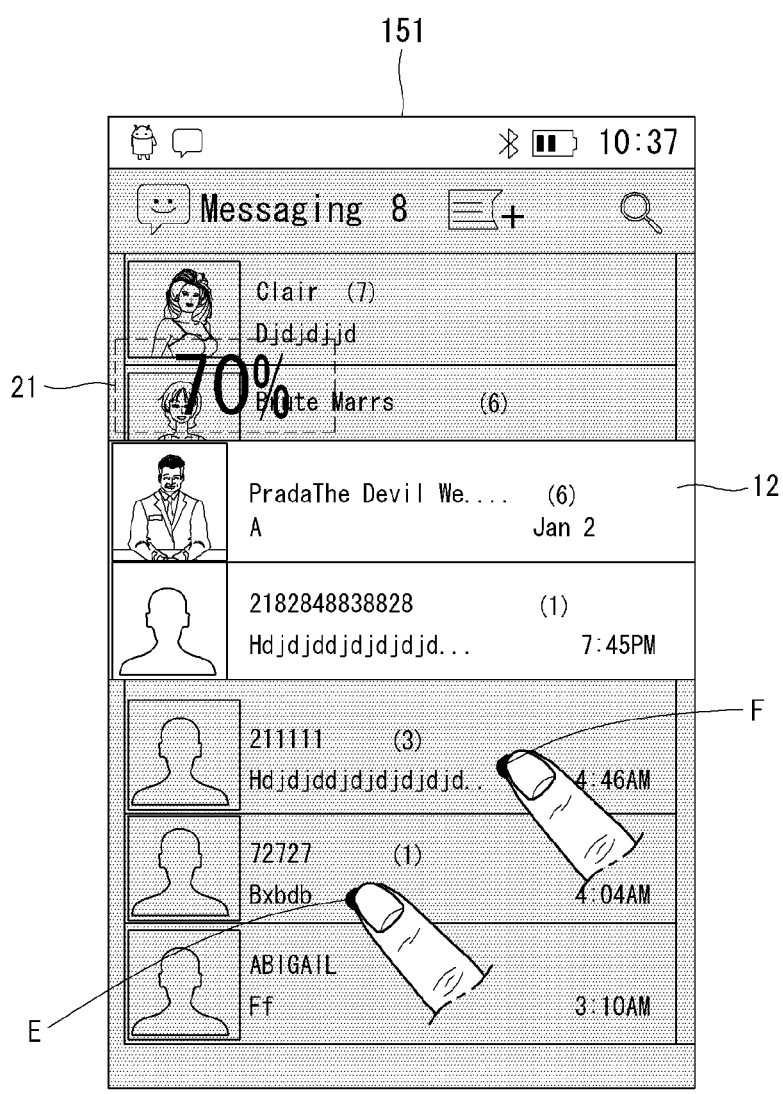
Figure 19:
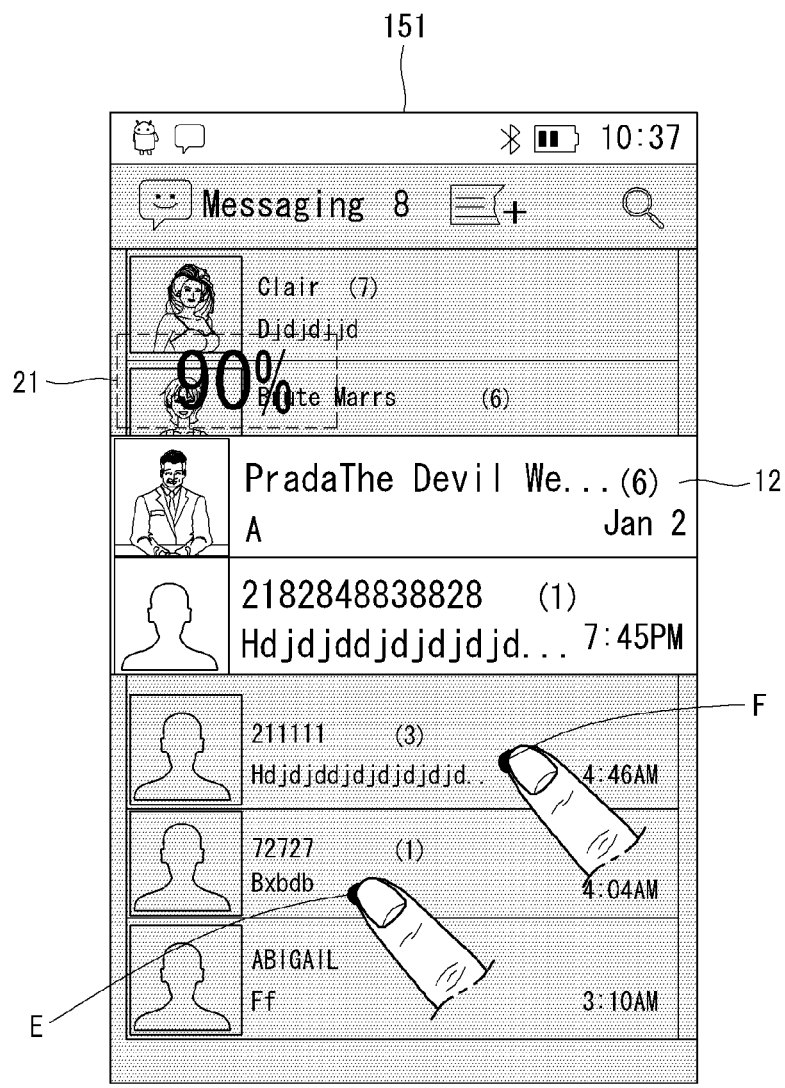
Figure 20:
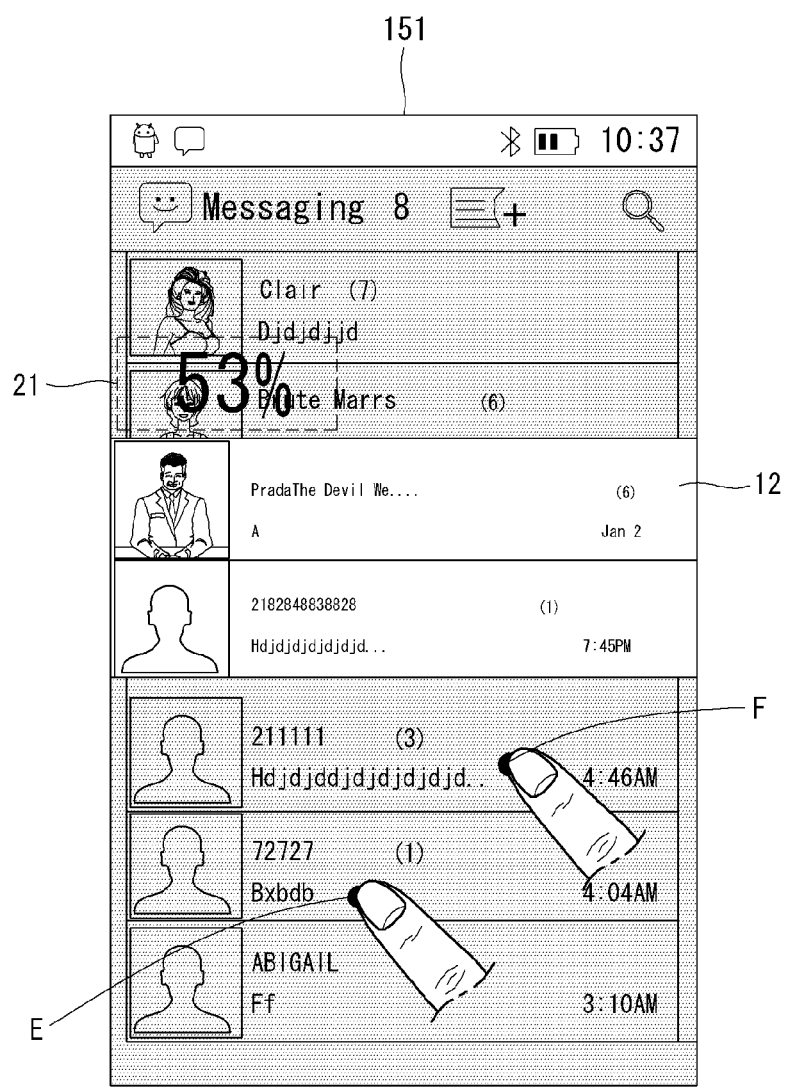

Next, FIGS. 18 to 20 illustrate examples in which the magnification rate currently applied to text information included in the selected specific area 12 is indicated by a numerical indicator 21 instead of the set 20 of letters illustrated in FIGS. 15 to 17.

For example, when the distance between the multi touch points is increased because the user spreads out his/her fingers, as illustrated in FIG. 19, and when the magnification rate of text information as applied in FIG. 18 is 70 percent, the controller 180 increases the magnification rate of text information included in the selected specific area 12 and indicates this using the numerical indicator (90%).

Furthermore, for example, when the distance between the multi touch points is decreased because the user makes his/her fingers closer, as illustrated in FIG. 20, the controller 180 decreases the magnification rate of text information included in the selected specific area 12 and indicates this using the numerical indicator (53%).

In the embodiments described above, the contact book like the phone book are exemplified, but, the prevent invention is not limited thereto. The present invention may be commonly applied to all applications displaying text information.

Examples are described below, in which the present invention is applied to applications other than the contact book. In particular, FIGS. 21 to 24 illustrate the examples in which the embodiment of the present invention is applied to a calendar application.

Figure 21:
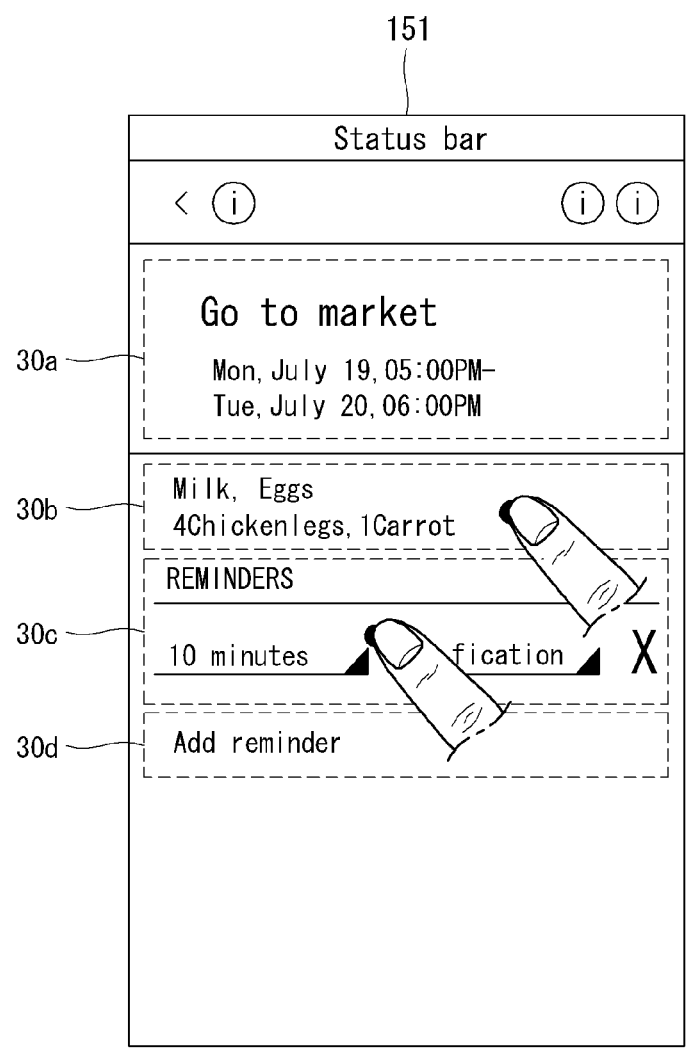
FIGS. 21 to 24 are diagrams illustrating the examples in which the embodiment of the present invention is applied to a calendar application.

With reference to FIG. 21, the controller 180, as in the embodiments described above, provides multiple areas 30a, 30b, 30c, and 30d, each of which includes text information, on the touch screen 151.

Figure 22:
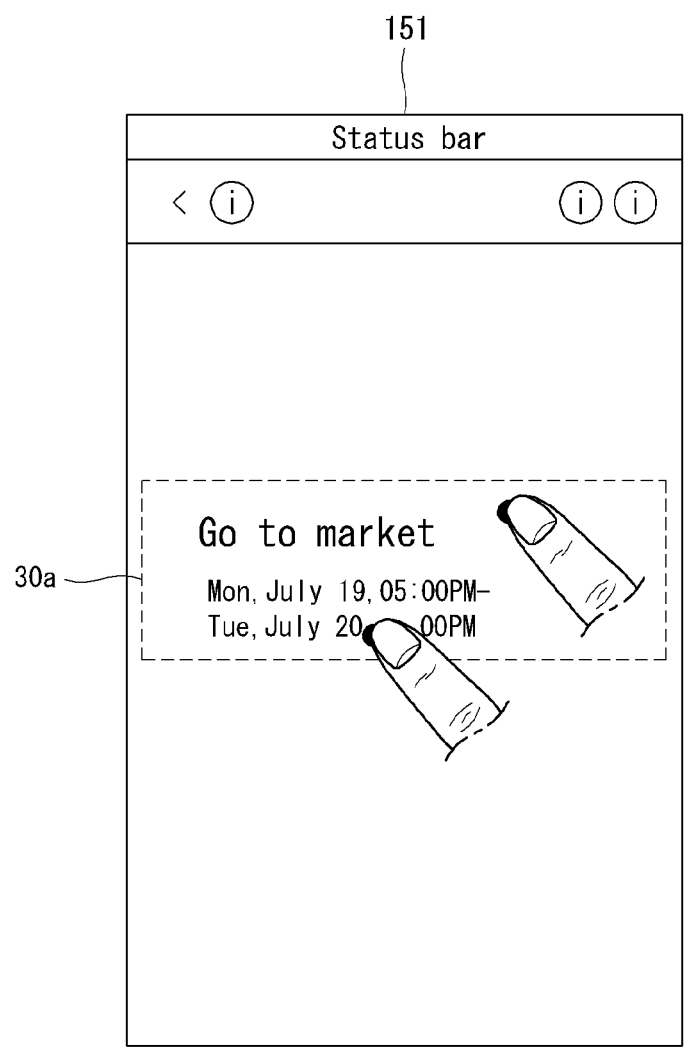

When receiving the multi touches via the touch screen 151 as illustrated in FIG. 21, the controller 180 selects the specific area 30a from among the multiple areas 30a, 30b, 30c, and 30d, moves the selected specific area 30a to a predetermined position and dims the other areas, as illustrated in FIG. 22.

Figure 23:
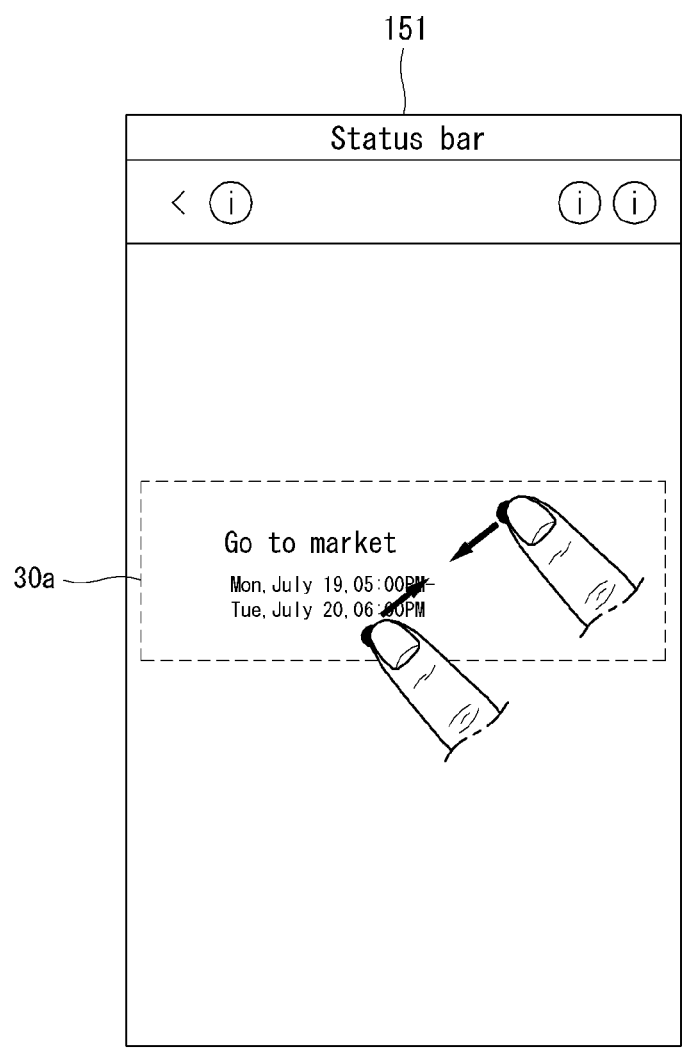

The controller 180 may also decrease the magnification rate of text information included in the selected specific area 30a when the distance between the multiple touch points is decreased, as illustrated in FIG. 23. Further, the controller 180 may return the selected specific area 30a to its original position, and at the same time may apply the magnification rate, last applied, to all of the multiple areas 30a, 30b, 30c, and 30d, when the multi touches are released.

Figure 24:
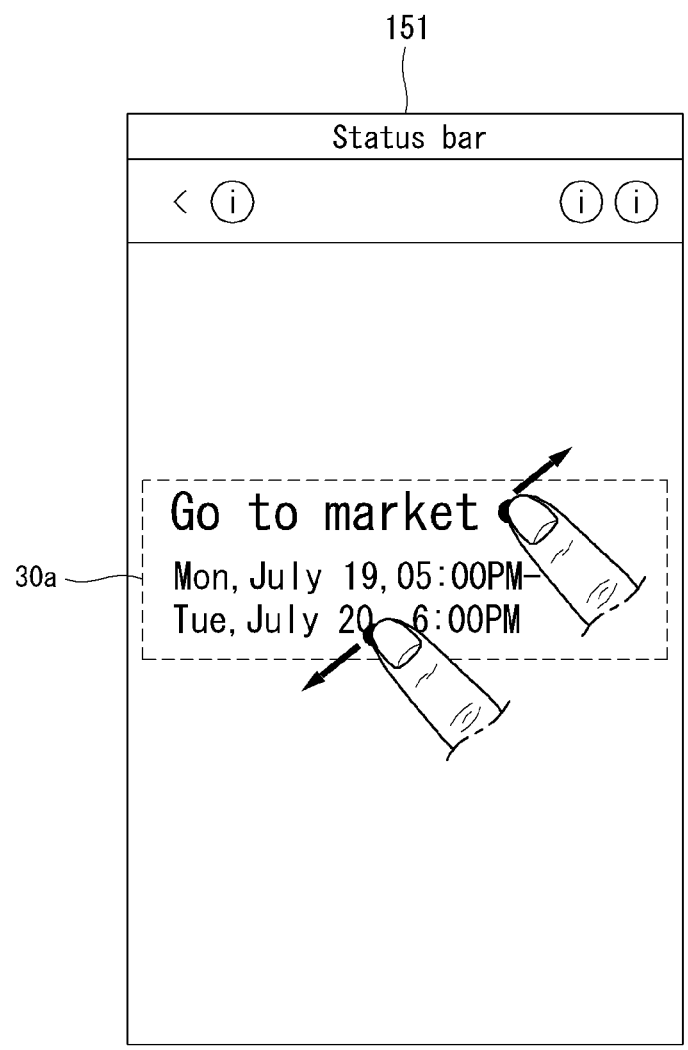

The controller 180 can also increase the magnification rate of text information included in the selected specific area 30a when the distance between the multiple touch points is increased, as illustrated in FIG. 24. And the controller may return the selected specific area 30a to its original position and at the same time may apply the magnification rate, last applied, to all of the multiple areas 30a, 30b, 30c, and 30d, when the multi touches are released.

Figure 25:
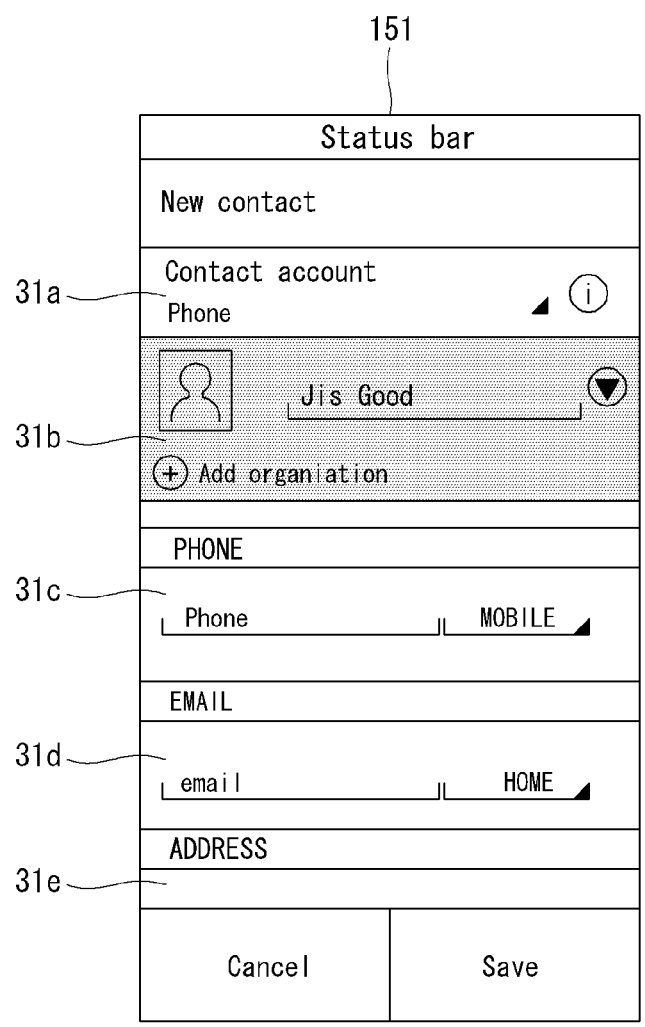
FIG. 25 is a diagram illustrating a screen example in which a new contact item is set in a contact book.

Next, FIG. 25 illustrates a screen example in which a new contact item is set in the contact book. With reference to FIG. 25, the controller 180 provides the multiple areas 31a, 31b, 31c, 31d, and 31e, each of which includes text information, on the touch screen 151. When the multi touches are input to the touch screen 151, areas corresponding to reference numbers 31a and 31b are selected and the embodiments of the present invention, described above, may be applied in the same manner. That is, two or more areas of the multiple areas 31a, 31b, 31c, 31d, and 31e may be selected and the embodiments of the present invention, described above, may be applied.

Figure 26:
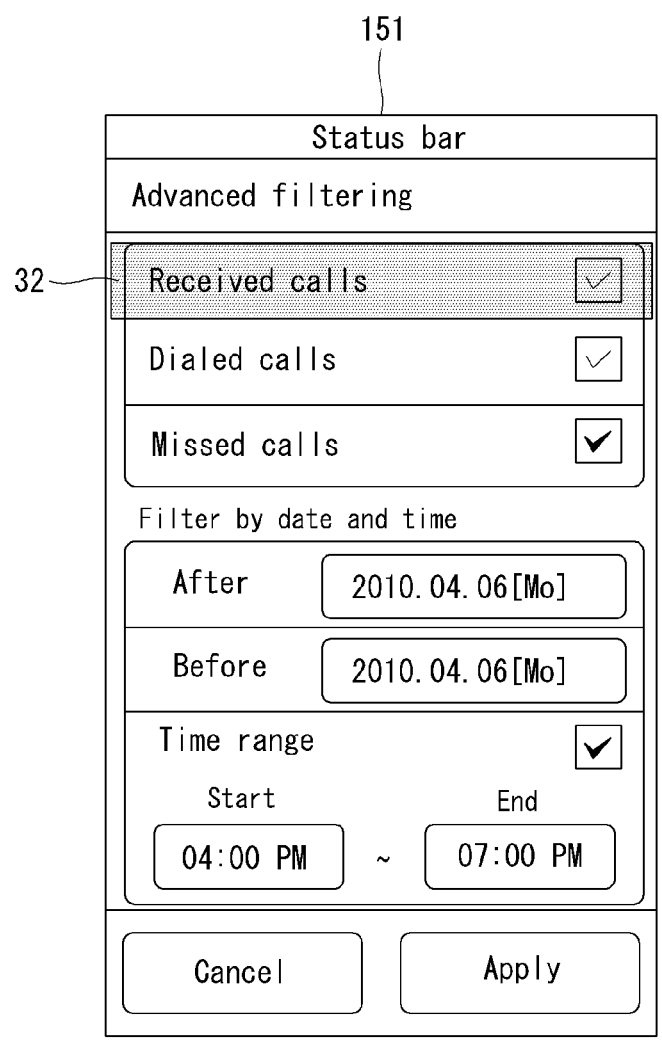
FIG. 26 is a diagram illustrating an example of a call log screen.

FIG. 26 illustrates an example of a call log screen. When the multi touches are input to the touch screen 151 in FIG. 26, an area corresponding to a reference number 32 is selected and the embodiments of the present invention, described above, may be applied in the same manner.

Figure 27:
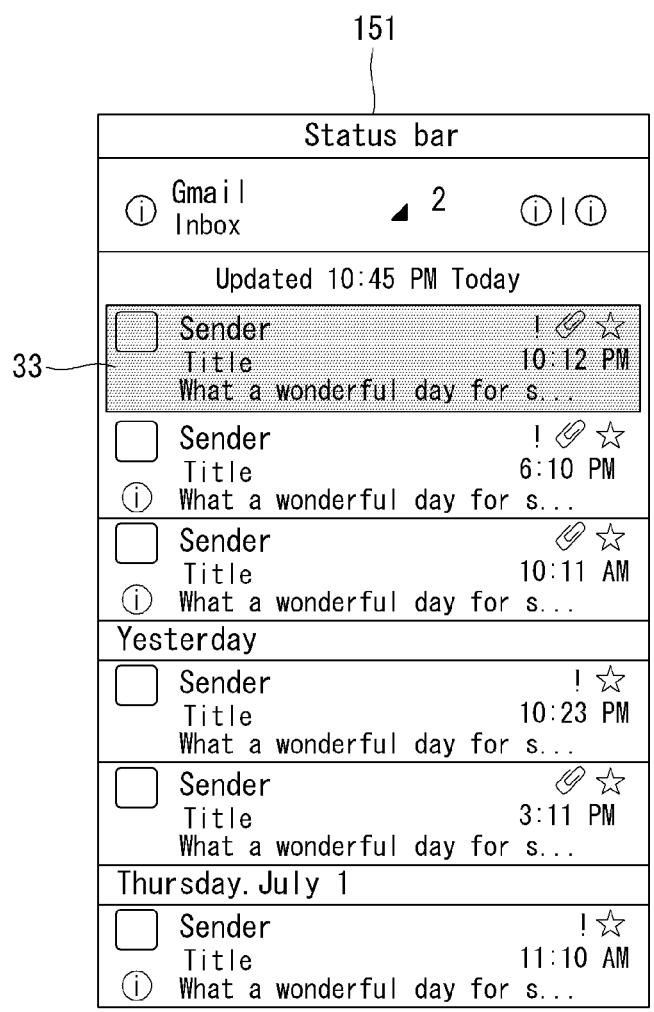
FIG. 27 is a diagram illustrating an example of an email application.

FIG. 27 illustrates an example of an email application. When the multi touches are input to the touch screen 151 in FIG. 27, an area corresponding to a reference number 33 is selected and the embodiments of the present invention, described above, may be applied in the same manner.

Figure 28:
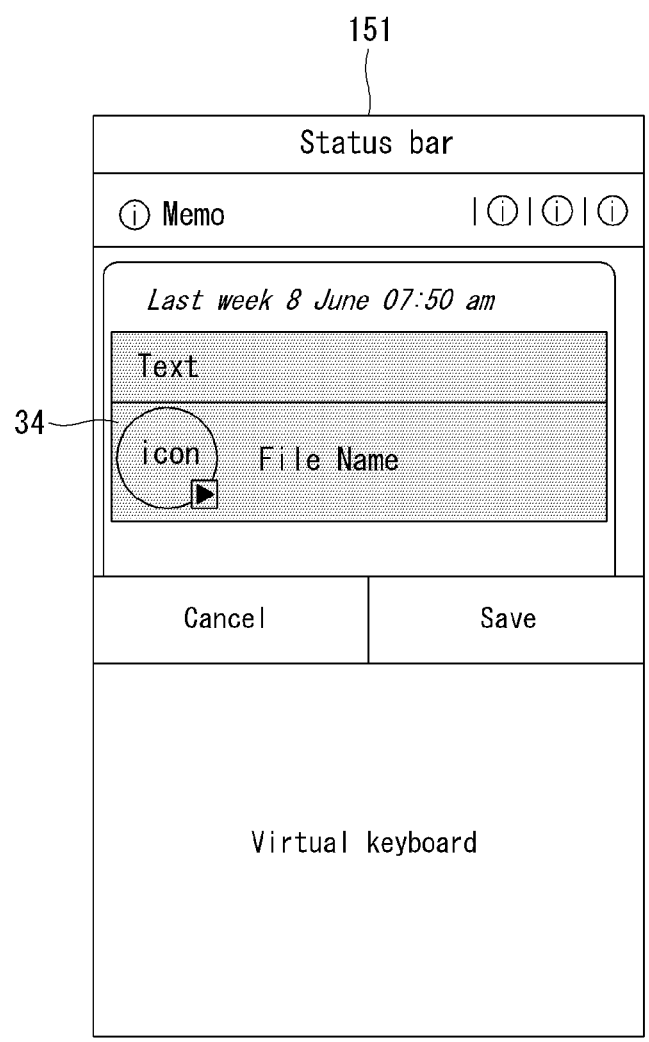
FIG. 28 is a diagram illustrating an example of a memo application.

FIG. 28 illustrates an example of a memo application. When the multi touches are input to the touch screen 151 in FIG. 28, an area corresponding to a reference number 34 is selected and the embodiments of the present invention, described above, may be applied in the same manner.

Figure 29:
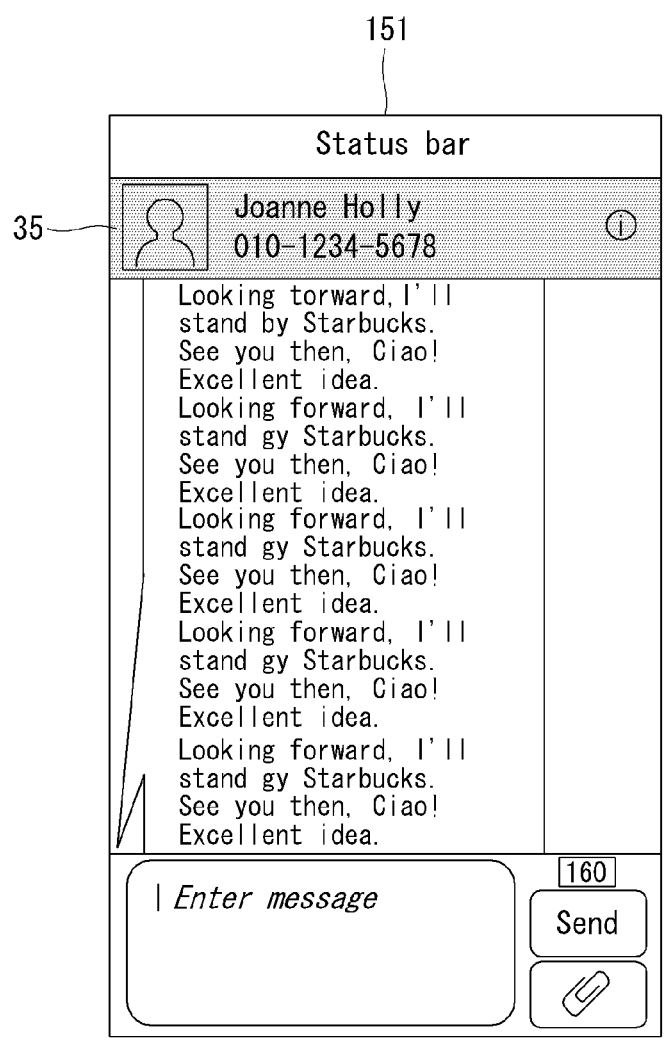
FIG. 29 is a diagram illustrating a screen example in which an incoming message is displayed.

FIG. 29 illustrates a screen example in which an incoming message is displayed. When the multi touches are input to the touch screen 151 in FIG. 29, an area corresponding to a reference number 35 is selected and the embodiments of the present invention, described above, may be applied in the same manner.

Figure 30:
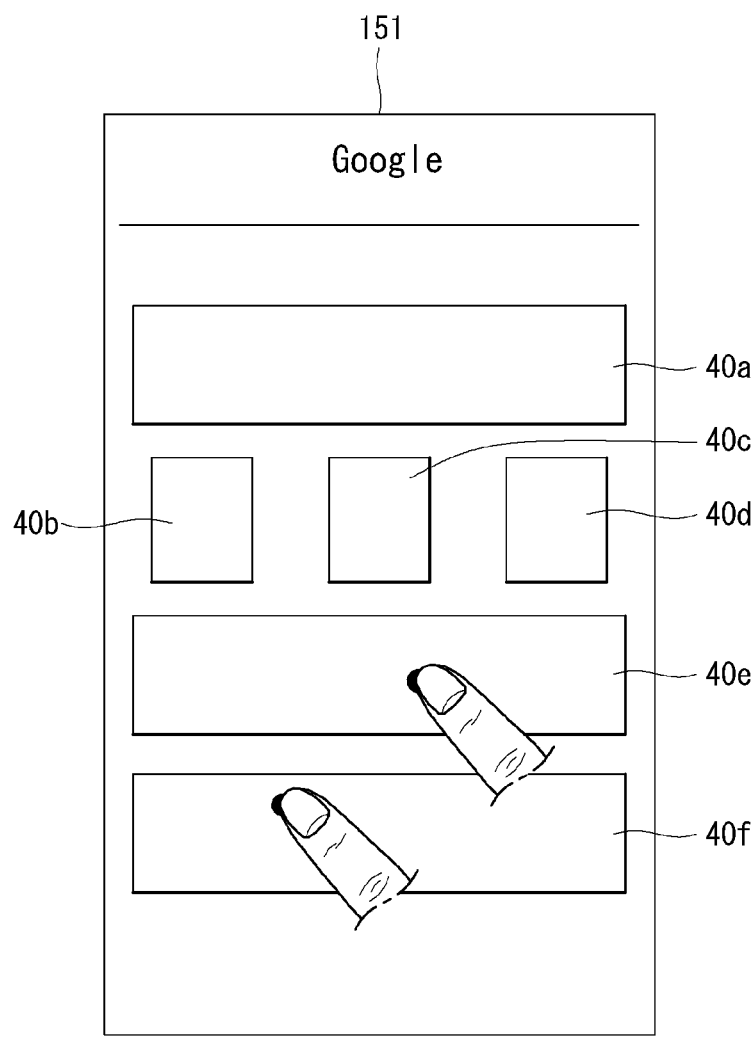
FIG. 30 is a diagram schematically illustrating a Web browser.

FIG. 30 is a diagram schematically illustrating a Web browser. With reference to FIG. 30, the controller 180 may display a Web page, provided by a specific server via the Web browser, to the touch screen 151. The Web page may include a variety of items of information. For example, as illustrated in FIG. 30, the Web page may include multiple areas 40a, 40b, 40c, 40d, 40e, and 40f, each of which includes text information. It is apparent that the Web page may include areas, including different items of information, other than the multiple areas 40a, 40b, 40c, 40d, 40e, and 40f.

When the multi touches are input to touch screen 151 in FIG. 30, the controller 180 may visually emphasize the multiple areas 40a 40b, 40c, 40d, 40e, and 40f, such as highlighting all of the multiple areas 40a, 40b, 40c, 40d, 40e, and 40f available for selection, in order to apply the present invention.

The user may input the multi touches with respect to the area that he/she intends to select in order to select the specific area, and then may adjust the magnification rate of text information according to the embodiments described above, after checking if which of the multiple areas 40a, 40b, 40c, 40d, 40e, and 40f is visually emphasized.

Figure 31:
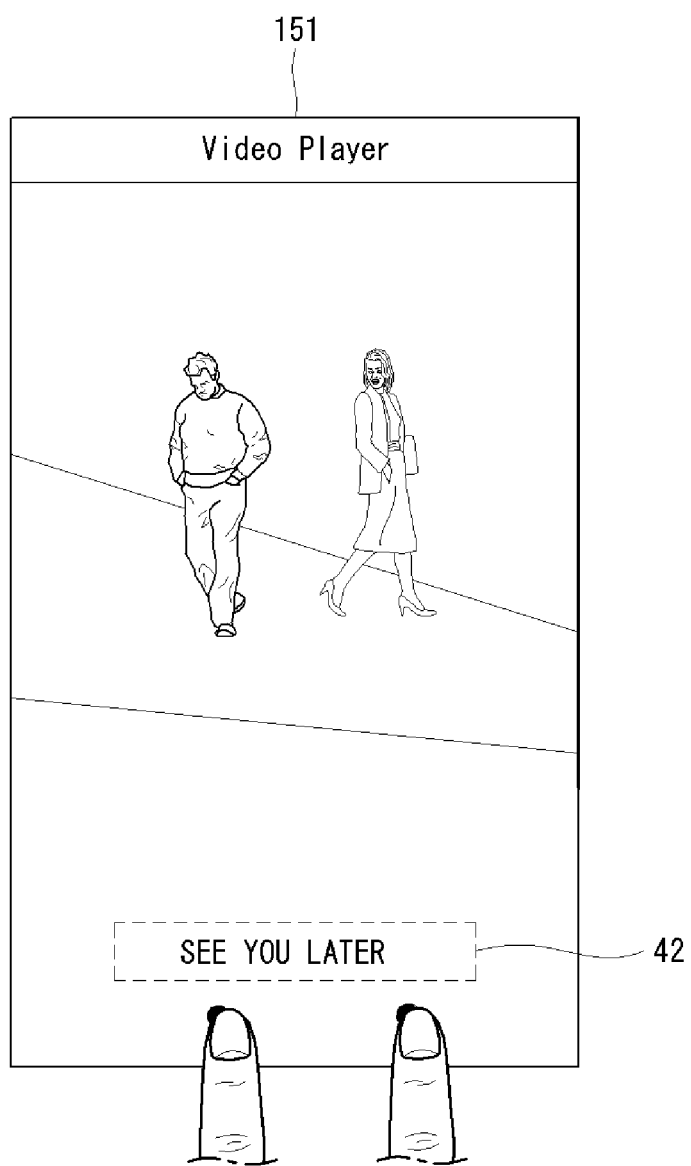
FIG. 31 is a diagram schematically illustrating a video player.

FIG. 31 is a diagram schematically illustrating a video player. When the multi touches are input to the touch screen 151 in FIG. 31, an area corresponding to a reference number 42 is selected and the embodiments of the present invention, described above, may be applied in the same manner. Text information included in the area 42 in FIG. 31 exemplifies subtitle information. Like this, even though one area including text information is provided on the touch screen 151, the present invention may be applied in the same manner.

Figure 32:
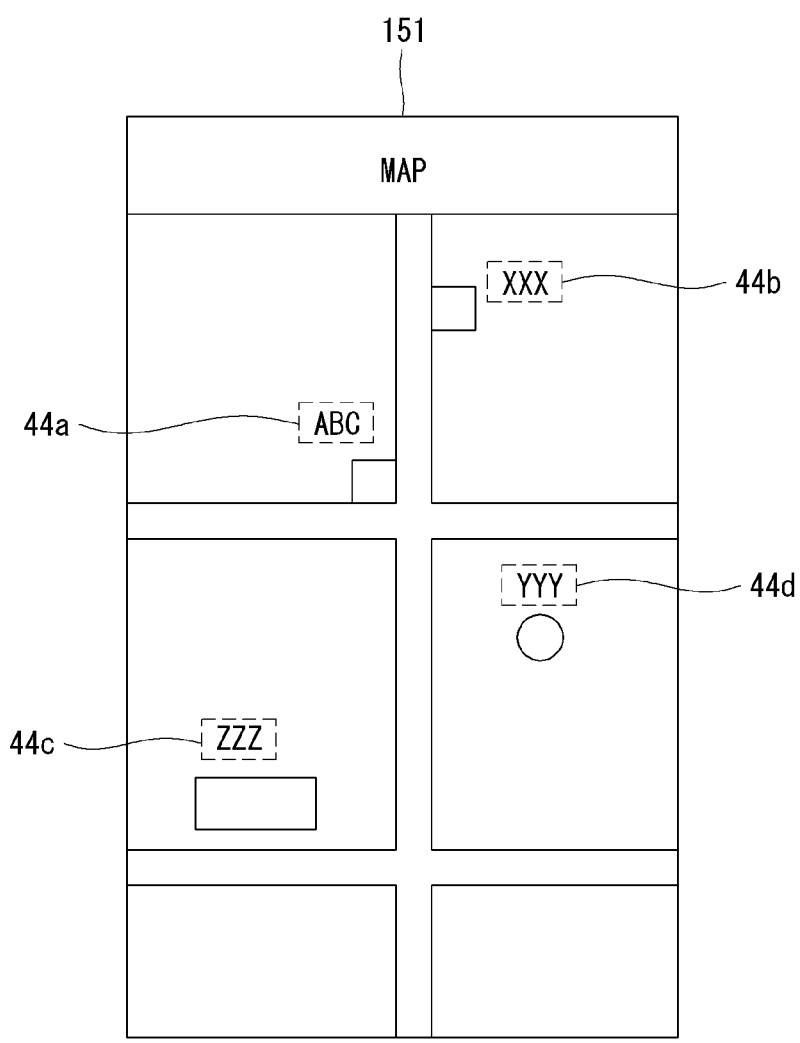
FIG. 32 is a diagram schematically illustrating a map application.

FIG. 32 is a diagram schematically illustrating a map application. The controller 180 provides the multiple areas 44a, 44b, 44c, and 44d, each of which includes text information, on the touch screen 151.

When the multi touches are input to the touch screen 151, the specific area is selected from among the multiple areas 44a, 44b, 44c, and 44d, and the embodiments of the present invention, described above, may be applied in the same manner.

In FIG. 32, each of the multiple areas 44a, 44b, 44c, and 44d exemplifies a POI (Point Of Interest). The screen, provided via the map application, may include an area including a variety of items of text information, other than POI, and also the embodiments of the present invention, described above, may be applied in the same manner.

Advantages according to the electronic device and the method of controlling the electronic device are as follows.

According to the present invention, the user can easily adjust the magnification rate of at least one item of text information by performing a simple operation with respect to the touch screen when at least the one item of information is displayed on the touch screen.

Furthermore, according to the present invention, the user can easily adjust the magnification rate of text information displayed on a current screen, without searching complicated menus or performing a system setting operation as required in the related art.

In addition, according to embodiments of the present invention, the user can determine the magnification rate that he/she wants to have while visually checking for changes in the magnification rate of text information displayed on the current screen.

Moreover, according to an embodiment of the present invention, the load to computing resources of the electronic device are reduced because the representative text are extracted and the rate of text information screen can be temporarily adjusted with respect to the representative text, when the multiple items of text information are displayed on the touch screen.

Furthermore, the embodiments described above are additionally applied to all applications or all screens capable of displaying text information such as a screen wallpaper or a home screen, an audio player, and a photo application.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touch screen; and
   a controller configured to:
   provide a plurality of areas on the touch screen, each area including text information,
   receive a multi touch action at multiple touch points on the touch screen,
   select a specific area from the plurality of provided areas according to a predetermined reference, wherein the specific area is selected regardless of a location of areas touched in the multi touch action,
   display the selected specific area in a form of a popup window at a predetermined position on the touch screen,
   determine at least one touch in the multi touch action is moving away from at least one of the multiple touch points after the popup window is displayed at the predetermined position,
   adjust a magnification rate of the text information included in the popup window in correspondence with the at least one touch moving,
   dim the plurality of areas other than the popup window, while adjusting the magnification rate of the text information included in the popup window, and
   display an indicator to visually indicate a process of adjusting the magnification rate of the text information on the touch screen, while adjusting the magnification rate of the text information included in the popup window,
   wherein the indicator includes a set of letters, different in size according to the process,
   wherein each of the letters included in the set of letters indicates a magnification rate currently applied to the text information included in the popup window in correspondence with the at least one touch moving,
   wherein the indicator is separately displayed from the text information,
   wherein a letter having a size corresponding to the currently applied magnification rate is visually emphasized, and
   wherein the controller is further configured to determine that at least one of the touches in the multi touch action is released, and to apply the magnification rate that was last adjusted before the at least one of the touches in the multi touch action was released to all of the plurality of provided areas or to just the popup window.

2. The mobile terminal of claim 1, wherein the controller is further configured to apply the magnification rate that was last adjusted before the at least one of the touches in the multi touch action was released to information displayed on the touch screen other than the plurality of provided areas.

3. The mobile terminal of claim 1, wherein the controller is further configured to fix the magnification rate of text information included in an area other than the popup window, while adjusting the magnification rate of text information included in the popup window in response to the at least one touch moving.

4. The mobile terminal of claim 1, wherein the controller is further configured to select a specific area that matches the predetermined reference from among a plurality of different references that exclude the areas touched in the multi touch action.

5. The mobile terminal of claim 1, wherein the plurality of provided areas includes a list of areas or a calendar of areas.

6. The mobile terminal of claim 1, wherein the text information is contact information.

7. A method of controlling a mobile terminal, the method comprising:
   providing, via a controller of the mobile terminal, a plurality of areas on a touch screen of the mobile terminal, each area including text information;
   receiving, via the touch screen, a multi touch action at multiple touch points on the touch screen;

selecting, via the controller, a specific area from the plurality of provided areas according to a predetermined reference, wherein the specific area is selected regardless of a location of areas touched in the multi touch action;

displaying the selected specific area in a form of a popup window at a predetermined position on the touch screen;

determining, via the controller, at least one touch in the multi touch action is moving away from at least one of the multiple touch points after the popup window is displayed at the predetermined position;

adjusting, via the controller, a magnification rate of the text information included in the popup window in correspondence with the at least one touch moving;

dimming the plurality of areas other than the popup window, while adjusting the magnification rate of the text information included in the popup window;

displaying an indicator to visually indicate a process of adjusting the magnification rate of the text information on the touch screen, while adjusting the magnification rate of the text information included in the popup window, wherein the indicator includes a set of letters, different in size according to the process, wherein each of the letters included in the set of letters indicates a magnification rate currently applied to the text information included in the popup window in correspondence with the at least one touch moving, wherein the indicator is separately displayed from the text information, and wherein a letter having a size corresponding to the currently applied magnification rate is visually emphasized, determining that at least one of the touches in the multi touch action is released; and applying the magnification rate that was last adjusted before the at least one of the touches in the multi touch action was released to all of the plurality of provided areas or to just the popup window.

8. The method of claim 7, further comprising:

applying the magnification rate that was last adjusted before the at least one of the touches in the multi touch action was released to information displayed on the touch screen other than the plurality of areas.

9. The method of claim 7, further comprising:

fixing the magnification rate of text information included in an area other than the popup window, while adjusting the magnification rate of text information included in the popup window in response to the at least one touch moving.

10. The method of claim 7, further comprising:

selecting a specific area that matches the predetermined reference from among a plurality of different references that exclude the areas touched in the multi touch action.

11. The method of claim 7, wherein the plurality of provided areas includes a list of areas or a calendar of areas.

12. The method of claim 7, wherein the text information is contact information.

* * * * *